US007914108B2

(12) United States Patent
Konno et al.

(10) Patent No.: US 7,914,108 B2
(45) Date of Patent: Mar. 29, 2011

(54) IMAGE FORMING APPARATUS AND METHOD, AND INK SET

(75) Inventors: Masaaki Konno, Ashigara-Kami-Gun (JP); Tetsuzo Kadomatsu, Ashigara-Kami-Gun (JP); Toshiyuki Makuta, Fujinomiya (JP)

(73) Assignee: Fujifilm Corporation, Tokyo (JP)

( * ) Notice: Subject to any disclaimer, the term of this patent is extended or adjusted under 35 U.S.C. 154(b) by 1224 days.

(21) Appl. No.: 11/508,215

(22) Filed: Aug. 23, 2006

(65) Prior Publication Data

US 2007/0046720 A1 Mar. 1, 2007

(30) Foreign Application Priority Data

Aug. 24, 2005 (JP) ................................ 2005-242764
Aug. 24, 2005 (JP) ................................ 2005-242765

(51) Int. Cl.
*B41J 2/015* (2006.01)
*B41J 2/01* (2006.01)
*B41J 2/06* (2006.01)
*G01D 11/00* (2006.01)

(52) U.S. Cl. ............ 347/21; 347/102; 347/55; 347/100

(58) Field of Classification Search .................. 347/102, 347/21, 55, 100, 15, 16, 101, 54, 125, 126
See application file for complete search history.

(56) References Cited

U.S. PATENT DOCUMENTS 5,032,307 A * 7/1991 Carlson .......................... 252/73
5,075,021 A * 12/1991 Carlson et al. .................. 252/73
6,179,418 B1 * 1/2001 Mizoguchi et al. ........... 347/102
6,254,230 B1 * 7/2001 Wen et al. ...................... 347/101
6,281,917 B1 * 8/2001 Katsuragi et al. ............. 347/100
6,309,064 B1 * 10/2001 Tanno et al. .................. 347/104
6,508,540 B1 * 1/2003 Lean et al. ...................... 347/55
6,513,924 B1 * 2/2003 Goldberg et al. ............. 347/106
6,550,882 B2 * 4/2003 Koitabashi et al. ............... 347/8
6,582,047 B2 * 6/2003 Koitabashi et al. ............. 347/16
6,585,364 B2 * 7/2003 Kasperchik et al. ............ 347/98
2003/0063172 A1 * 4/2003 Ohtsu et al. .................. 347/102
2003/0112307 A1 * 6/2003 Maeda et al. ................. 347/102
2004/0090487 A1 * 5/2004 Kanemura ....................... 347/35
2004/0106700 A1 * 6/2004 Yamanouchi et al. ........ 523/160
2005/0046684 A1 * 3/2005 Yoneyama .................... 347/102
2005/0093952 A1 * 5/2005 Hoshino ....................... 347/102
2005/0200644 A1 * 9/2005 Bradley .......................... 347/19
2005/0270355 A1 * 12/2005 Sootome et al. .............. 347/104
2006/0050112 A1 * 3/2006 Moynihan ....................... 347/85

FOREIGN PATENT DOCUMENTS

JP 02212149 A * 8/1990

(Continued)

*Primary Examiner* — Stephen D Meier
*Assistant Examiner* — Leonard S Liang
(74) *Attorney, Agent, or Firm* — Birch, Stewart, Kolasch & Birch, LLP

(57) ABSTRACT

The image forming apparatus comprises: a treatment liquid deposition device which deposits treatment liquid onto a recording medium, the treatment liquid containing a polymerization initiator and particles introducing electrorheological properties; an electric field application device which applies an electric field to the treatment liquid having been deposited on the recording medium; an ink ejection device which ejects ink toward the recording medium on which the treatment liquid has been deposited, the ink containing a coloring material and a radiation-curable polymerizable compound; and a radiation irradiation device which irradiates radiation to cure the ink having been deposited on the recording medium.

5 Claims, 16 Drawing Sheets

FOREIGN PATENT DOCUMENTS

| | | | | |
|---|---|---|---|---|
| JP | 5-4343 | A | | 1/1993 |
| JP | 05004342 | A | * | 1/1993 |
| JP | 10-287035 | A | | 10/1998 |
| JP | 2000-135781 | A | | 5/2000 |
| JP | 2003-12971 | A | | 1/2003 |
| JP | 2004009483 | A | * | 1/2004 |

* cited by examiner

IMAGE FORMING APPARATUS AND METHOD, AND INK SET

BACKGROUND OF THE INVENTION

1. Field of the Invention

The present invention relates to image forming apparatus and method, and an ink set, and more particularly to image forming technology suitable for an inkjet recording apparatus which forms images of high quality on a recording medium by using ink containing a coloring material, and a treatment liquid.

2. Description of the Related Art

Japanese Patent Application Publication No. 10-287035 discloses an inkjet recording method wherein a reaction liquid includes a photopolymerization initiator, and the ink composition includes an acrylate monomer. Japanese Patent Application Publication No. 2000-135781 discloses an inkjet recording apparatus comprising an ink unit which ejects recording ink toward a recording member, and a treatment liquid unit which ejects treatment liquid toward the recording ink deposited by the ink unit, in such a manner that at least a portion of the image is formed by means of the recording ink and the treatment liquid mixing and curing on the recording member. Japanese Patent Application Publication No. 2003-12971 discloses an inkjet recording method in which the ink composition includes a polymerizable compound and a coloring material, the content of the polymerizable compound in the ink composition being 30 to 98 wt %, and a reaction liquid includes a polymerizable compound and a polymerization initiator.

Japanese Patent Application Publication Nos. 10-287035, 2000-135781 and 2003-12971 disclose technology for separating an ultraviolet-curable ink (so-called "UV ink") into two-liquid phases; however, there is a problem in that the functional effects of the treatment liquid are attenuated (or reduced) due to the permeation of the treatment liquid in cases where the recording medium has high permeability and the first liquid permeates rapidly. In respect of this problem, there is no disclosure or suggestion about a method for causing the two liquids to effectively mix together.

Japanese Patent Application Publication No. 5-4343 discloses a recording apparatus comprising a recording head which applies a recording liquid having electrorheological properties and a device for creating an electric field on the surface to which the recording liquid is applied. Japanese Patent Application Publication No. 5-4343 discloses technology for preventing bleeding and color mixing by means of the effects of an electrorheological fluid; however, the relationship with the UV ink is not described.

SUMMARY OF THE INVENTION

The present invention has been contrived in view of the foregoing circumstances, an object thereof being to provide an image forming apparatus and method, and an ink set, which make it possible to achieve effective mixing (reaction) of two liquids, and to form images of high quality, even when using a recording medium of high permeability.

In order to attain the aforementioned object, the present invention is directed to an image forming apparatus, comprising: a treatment liquid deposition device which deposits treatment liquid onto a recording medium, the treatment liquid containing a polymerization initiator and particles introducing electrorheological properties; an electric field application device which applies an electric field to the treatment liquid having been deposited on the recording medium; an ink ejection device which ejects ink toward the recording medium on which the treatment liquid has been deposited, the ink containing a coloring material and a radiation-curable polymerizable compound; and a radiation irradiation device which irradiates radiation to cure the ink having been deposited on the recording medium.

According to the present invention, before ink is deposited onto the recording medium, a treatment liquid (pre-treatment liquid) is deposited onto the recording medium, and an electric field is applied to the treatment liquid on the recording medium. The viscosity of the treatment liquid is increased by an electrorheological effect, thereby suppressing permeation of the treatment liquid into the recording medium (lowering the speed of permeation into the recording medium). In this way, by ejecting ink in a state where there is sufficient treatment liquid remaining on the recording medium, it is possible to achieve reliable mixing of the two liquids, and it is also possible to avoid a phenomenon in which the ink droplets combine together (unite) (known as "landing interference"). Furthermore, by promoting the curing reaction by irradiating radiation, it is possible to achieve curing and fixing of the ink in a short period of time, as well as forming images of high quality and achieving high-speed printing. Examples of the radiation are: electromagnetic waves, such as visible light, ultraviolet light, and X rays, an electron beam, and the like.

Furthermore, when applying an electric field, a desirable mode is one in which control is performed in order to apply the minimum level of electric field required in order to suppress the permeation of the treatment liquid. Accordingly, it is possible to prevent increase in the viscosity of the treatment liquid in the head when using a liquid ejection head as a treatment liquid deposition device.

In one example of an electric field application device for achieving an electrorheological effect, there is a mode having a structure in which an electrode pair comprising a first electrode and a second electrode are arranged, and a prescribed electric field intensity is generated, in the region peripheral to the electrode pair, when a relative potential difference is applied between the first electrode and the second electrode (in other words, when a voltage is applied to same). In this mode, in the electrode pair comprising the first and second electrodes, naturally, one electrode is a positive electrode and the other electrode is a negative electrode, and either of the electrodes may be used as the positive or negative electrode.

The electric field application device may also be combined with an electrostatic attraction device which holds the recording medium stably by means of electrostatic attraction. In other words, it is possible to apply an electric field to the treatment liquid on the recording medium by using the electric field created by the electrostatic attraction device which holds the recording medium (on a belt or roller, for example).

Other modes of the electric field application device include modes, such as: (a) a mode where the treatment liquid is interposed between plate-shaped electrodes having a high potential difference; (b) a combination of charging of the recording medium and the treatment liquid by means of a conductive rubber roller, a conductive brush, corona discharge, or the like, and electrodes disposed in the vicinity of the recording medium; (c) a combination of charging of the recording medium and the treatment liquid by means of electron beam irradiation or ion irradiation onto the recording medium or treatment liquid on the recording medium, and electrodes disposed in the vicinity of the recording medium; (d) a combination of charging of the droplets (the droplets of treatment liquid) themselves by passing the projected droplets through an electric field, and electrodes disposed in the vicinity of the recording medium; and the like.

Preferably, the image forming apparatus further comprises: a recording medium type identification device which identifies a type of the recording medium; and an electric field control device which controls the electric field created by the electric field application device in accordance with the type of the recording medium identified by the recording medium type identification device.

Since the permeability of the liquid or the droplets having been deposited on the recording medium varies depending on conditions such as the type and thickness of the recording medium, the dielectric constant thereof, and so on, it is then desirable that the type of recording medium is ascertained by means of a recording medium type identification device, and the electric field is controlled appropriately in accordance with the type of medium, by application (ON)/non-application (OFF) of the electric field, or the electric field intensity when an electric field is applied, or a combination of these. Accordingly, it is possible to print under optimal conditions in relation to the type of recording medium.

For example, if a highly permeable medium is used, then an electric field is applied, thereby suppressing the permeation of the treatment liquid, whereas if a medium of low permeability (non-permeable medium or low-permeability medium) is used, then an electric field is not applied.

A more desirable mode of a device which controls the electric field intensity when an electric field is applied is one having a composition where the electric field intensity is adjusted automatically on the basis of information obtained by the recording medium type identification device, but it is also possible to adopt a composition in which the electric field intensity is switched or changed by manual operation performed by an operator, or the like.

The recording medium type identification device may comprise, for example, a device which measures the reflectivity of the recording medium, or a device which reads in the type of the recording medium used from the ID, or the like, of the supply magazine. Furthermore, the recording medium type identification device is not limited to a device which obtains information automatically by means of sensors, an information reading device, or the like, and it may also be constituted in such a manner that information relating to the type of recording medium or the like is input by a user by means of a prescribed input apparatus (user interface), or the like.

Preferably, the treatment liquid further contains a coloring material dispersion inhibitor which prevents dispersion of the coloring material.

By mixing of the treatment liquid and the ink of this mode, the dispersion of the coloring material on the recording medium is suppressed and hence it is possible to prevent bleeding.

In order to attain the aforementioned object, the present invention is also directed to an image forming apparatus, comprising: a first treatment liquid deposition device which deposits a first treatment liquid onto a recording medium, the first treatment liquid containing a polymerization initiator and particles introducing electrorheological properties; an electric field application device which applies an electric field to the first treatment liquid having been deposited on the recording medium; a second treatment liquid deposition device which deposits a second treatment liquid onto the recording medium, the second treatment liquid containing a polymerization initiator and having no electrorheological properties; a recording medium type identification device which identifies a type of the recording medium; a treatment liquid selection control device which controls operation of the first treatment liquid deposition device and the second treatment liquid deposition device, in such a manner that one of the first treatment liquid and the second treatment liquid is selectively deposited onto the recording medium, in accordance with the type of the recording medium identified by the recording medium type identification device; an ink ejection device which ejects ink toward the recording medium on which the one of the first treatment liquid and the second treatment liquid has been deposited, the ink containing a coloring material and a radiation-curable polymerizable compound; and a radiation irradiation device which irradiates radiation to cure the ink having been deposited on the recording medium.

According to the present invention, at least two types of treatment liquids (a first and a second treatment liquids) are provided, and the treatment liquids are switched in accordance with the type of recording medium used. The first and second treatment liquids are similar in that they both contain a polymerization initiator, but the first treatment liquid contains particles which introduce electrorheological properties and is therefore an electrorheological fluid, which has electrorheological properties, whereas the second treatment liquid is a non-electrorheological fluid which does have electrorheological properties.

According to this aspect of the present invention, it is also possible to deposit a suitable treatment liquid according to the type of recording medium. Furthermore, if the first treatment liquid is selected, then by applying an electric field, the permeation of the first treatment liquid into the recording medium is suppressed by an electrorheological effect. In this way, by ejecting ink in a state where there is sufficient treatment liquid remaining on the recording medium, it is possible to achieve reliable mixing of the two liquids, and it is also possible to avoid a phenomenon in which the ink droplets combine together (unite) (landing interference). Furthermore, since the curing reaction is promoted by irradiating radiation, it is possible to achieve curing and fixing of the ink in a short period of time, as well as forming images of high quality and achieving high-speed printing.

Preferably, the image forming apparatus further comprises an electric field control device which controls the electric field created by the electric field application device in accordance with the type of the recording medium identified by the recording medium type identification device.

Desirably, the electric field is controlled suitably in accordance with the selection of the treatment liquid in accordance with the type of recording medium, by means of the application (ON) or non-application (OFF) of the electric field, or the electric field intensity when an electric field is applied, or a combination of these, or the like. Since the permeability of the liquid with respect to the recording medium depends on the type of the recording medium, then a suitable treatment liquid is selected in accordance with the type of the recording medium, as well as being able to print under optimal conditions according to the recording medium, by controlling the electric field suitably.

For example, if a medium of high permeability is used, then the first treatment liquid is selected and an electric field is applied, thereby suppressing permeation of the first treatment liquid by means of an electrorheological effect. On the other hand, if a medium of low permeability (non-permeable medium or low-permeability medium) is used, then the second treatment liquid is selected and no electric field is applied.

Preferably, each of the first treatment liquid and the second treatment liquid further contains a coloring material dispersion inhibitor which prevents dispersion of the coloring material.

By mixing of the treatment liquid and the ink in this mode, the dispersion of the coloring material on the recording medium is suppressed and hence it is possible to prevent bleeding.

The treatment liquid deposition device of the image forming apparatus may be a device which ejects droplets of the treatment liquid, by using an inkjet-type ejection head, a device which applies the treatment liquid by means of a roller, a brush, a blade-shaped member, a porous member, or the like, a device which deposits a treatment liquid by spraying a mist, or a suitable combination of these.

For the ink ejection device, it is suitable to use an inkjet droplet ejection head which ejects ink liquid on the basis of image information for printing (print data).

The inkjet recording apparatus according to one mode of the image recording apparatus of the present invention comprises: a liquid ejection head (corresponding to a "recording head") having a droplet ejection element row in which a plurality of droplet ejection elements are arranged in a row, each droplet ejection element comprising a nozzle for ejecting an ink droplet in order to form a dot and a pressure generating device (piezoelectric element, heating element, or the like) which generates an ejection pressure; and an ejection control device which controls the ejection of droplets from the recording head on the basis of droplet ejection arrangement data (dot data) generated from the image data. An image is formed on a recording medium by means of the ink droplets ejected from the nozzles.

One compositional example of a recording head (ink ejection device) is a full line type head in which a plurality of nozzles are arranged through a length corresponding to the full width of the recording medium. In this case, a mode may be adopted in which a plurality of relatively short recording head modules having nozzles rows which do not reach a length corresponding to the full width of the recording medium are combined and joined together, thereby forming nozzle rows of a length that correspond to the full width of the recording medium.

A full line type head is usually disposed in a direction that is perpendicular to the relative feed direction (relative conveyance direction) of the recording medium, but a mode may also be adopted in which the recording head is disposed following an oblique direction that forms a prescribed angle with respect to the direction perpendicular to the conveyance direction.

A "recording medium" is a medium onto which the liquid ejected from the liquid ejection head (recording head) is deposited, and it receives the recording of an image by the action of the recording head. More specifically, the "recording medium" indicates a print medium, image forming medium, image receiving medium, ejection receiving medium, or the like. This term includes various types of media, irrespective of material and size, such as continuous paper, cut paper, sealed paper, resin sheets, such as OHP sheets, film, cloth, a printed circuit board on which a wiring pattern, or the like, is formed, and an intermediate transfer medium, and the like.

The "conveyance device" may include a mode where the recording medium is conveyed with respect to a stationary (fixed) recording head, or a mode where a recording head is moved with respect to a stationary recording medium, or a mode where both the recording head and the recording medium are moved.

When forming color images by means of an inkjet head, it is possible to provide recording heads for a plurality of colored inks (recording liquids), or it is possible to eject inks of a plurality of colors, from one recording head.

Furthermore, the present invention is not limited to a full line head, and may also be applied to a shuttle scanning type recording head (a recording head which ejects droplets while moving reciprocally in a direction substantially perpendicular to the conveyance direction of the recording medium).

In order to attain the aforementioned object, the present invention is also directed to an image forming method, comprising: a treatment liquid deposition step of depositing treatment liquid onto a recording medium, the treatment liquid containing a polymerization initiator and particles introducing electrorheological properties; an electric field application step of applying an electric field to the treatment liquid having been deposited on the recording medium; an ink ejection step of ejecting ejects ink toward the recording medium on which the treatment liquid has been deposited, the ink containing a coloring material and a radiation-curable polymerizable compound; and a radiation irradiation step of irradiating radiation to cure the ink having been deposited on the recording medium.

Preferably, the image forming method further comprises: a recording medium type identification step of identifying a type of the recording medium, wherein the electric field created in the electric field application step is controlled in accordance with the type of the recording medium identified in the recording medium type identification step.

In order to attain the aforementioned object, the present invention is also directed to an image forming method of forming an image on a recording medium, the method comprising: a treatment liquid preparation step of preparing a first treatment liquid and a second treatment liquid, the first treatment liquid containing a polymerization initiator and particles introducing electrorheological properties, the second treatment liquid containing a polymerization initiator and having no electrorheological properties; a recording medium type identification step of identifying a type of the recording medium; a treatment liquid selection step of selecting one of the first treatment liquid and the second treatment liquid in accordance with the type of recording medium identified in the recording medium type identification step; a treatment liquid deposition step of depositing the one of the first treatment liquid and the second treatment liquid selected in the treatment liquid selection step, onto the recording medium; an electric field application step of, if the first treatment liquid is selected in the treatment liquid selection step, applying an electric field to the first treatment liquid having been deposited on the recording medium; an ink ejection step of ejecting ink toward the recording medium on which the one of the first treatment liquid and the second treatment liquid has been deposited, the ink containing a coloring material and a radiation-curable polymerizable compound; and a radiation irradiation step of irradiating radiation to cure the ink having been deposited on the recording medium.

Preferably, the electric field created in the electric field application step is controlled in accordance with the type of the recording medium identified in the recording medium type identification step.

In order to attain the aforementioned object, the present invention is also directed to an image forming apparatus, comprising: a treatment liquid deposition device which deposits treatment liquid onto a recording medium, the treatment liquid containing a polymerization initiator, electrorheological property introducing particles introducing electrorheological properties, and a solvent, the electrorheological property introducing particles and the solvent both being made of materials that are colorless and transparent and have mutually proximate refractive indices; an electric field application device which applies an electric field to the treatment liquid having been deposited on the recording medium; an ink ejection device which ejects ink toward the recording medium on which the treatment liquid has been deposited, the ink containing a coloring material and a radiation-curable polymerizable compound; and a radiation irradiation device which irradiates radiation to cure the ink having been deposited on the recording medium.

According to the present invention, before ink is deposited onto the recording medium, a treatment liquid (pre-treatment liquid) is deposited onto the recording medium, and an electric field is applied to the treatment liquid on the recording medium. The viscosity of the treatment liquid is increased by an electrorheological effect, thereby suppressing permeation of the liquid into the recording medium (lowering the speed of permeation into the recording medium). In this way, it is possible to achieve reliable mixing of the two liquids by ejecting ink in a state where a sufficient amount of treatment liquid is remaining on the recording medium, and furthermore, by curing and fixing by irradiating radiation onto the mixed liquid, it is possible to form images of high quality. More specifically, it is possible to suppress permeation of treatment liquid into the recording medium (and in particular, into a permeable medium of high permeability) by increasing the viscosity of the treatment liquid by means of an electrorheological effect. Therefore, attenuation of the functional effects of the treatment liquid due to permeation of the treatment liquid on the recording medium can be prevented. Furthermore, it is possible to suppress spreading of the coloring material in the treatment liquid, by increasing the viscosity of the treatment liquid by means of an electrorheological effect.

Moreover, in the present invention, both the solvent and the electrorheological property introducing particles of the treatment liquid are both colorless and transparent, and are made of materials having mutually proximate refractive indices. Therefore, the treatment liquid is prevented from becoming clouded, and a colorless and transparent treatment liquid can be achieved. Consequently, it is possible to reproduce the ink colors faithfully, and hence deterioration of image quality can be prevented.

Moreover, by causing the curing reaction to proceed by irradiation of radiation after deposition of the ink, it is possible to achieve curing and fixing of the ink in a short period of time, and hence high-speed printing can be achieved.

Since the permeability of the liquid and the behavior of the deposited droplets on the recording medium vary, depending on conditions such as the material and thickness of the recording medium and the dielectric constant, and the like, then it is desirable that the image forming apparatus further comprises a recording medium type identification device which identifies a type of the recording medium; and an electric field control device which controls the electric field created by the electric field application device in accordance with the type of the recording medium identified by the recording medium type identification device.

The type of recording medium is ascertained by using the recording medium type identification device, and by controlling the electric field suitably in accordance with the type of medium, namely, by controlling the application (ON) or non-application (OFF) of the electric field, or the intensity of the electric field in cases where an electric field is applied, or a combination of these, it is possible to print under optimal conditions in accordance with the recording medium used.

The treatment liquid deposition device of the image forming apparatus according to the present invention may be a device which ejects droplets of the treatment liquid by using an inkjet-type ejection head (a device using inkjet nozzles), a device which applies the treatment liquid by means of a roller, a brush, a blade-shaped member, a porous member, or the like, a device which deposits the treatment liquid by spraying a mist, or a suitable combination of these.

For the ink ejection device, it is suitable to use an inkjet droplet ejection head which ejects ink liquid on the basis of image information for printing (print data).

Preferably, the treatment liquid further contains a coloring material dispersion inhibitor which prevents dispersion of the coloring material.

By mixing of the treatment liquid and the ink in this mode, the dispersion of the coloring material on the recording medium is prevented reliably and hence it is possible to prevent bleeding.

Preferably, an average size of the electrorheological property introducing particles is 0.3 μm to 10 μm; and the treatment liquid deposition device includes an application device which applies the treatment liquid while making contact with the recording medium.

If the average particle size of the electrorheological property introducing particles dispersed in the treatment liquid is 0.3 μm to 10 μm, then from the viewpoint of the liquid characteristics of the treatment liquid, a mode where the treatment liquid is applied by using an application member, such as a roller, is easier to implement than a mode where droplets of the treatment liquid are ejected by means of an inkjet method. There is no restriction from the viewpoint of the suitability of inkjet ejection, and since particles having a relatively large size, which are suitable for introducing electrorheological properties, can be used, then it is possible to produce a sufficiently large electrorheological effect.

By using a radiation-curable polymerizable compound as the solvent of the treatment liquid, a merit is obtained in that the treatment liquid deposited onto the non-image sections can also be cured.

Alternatively, it is also preferable that an average size of the electrorheological property introducing particles is 100 nm to 1 μm; and the treatment liquid deposition device includes an ejection device which ejects droplets of the treatment liquid by an inkjet method.

If the average particle size of the electrorheological property introducing particles dispersed in the treatment liquid is 100 nm to 1 μm, then the characteristics of the treatment liquid are suitable for ejection in the form of droplets by an inkjet method, and therefore, in such cases, a mode where the treatment liquid is deposited by means of an inkjet-type ejection device can be selected. According to this mode, since the treatment liquid can be deposited selectively, only on those regions of the recording medium where it is required, then it is possible to reduce wasteful consumption of treatment liquid in comparison with an application device.

Preferably, the image forming apparatus further comprises: a treatment liquid tank which stores the treatment liquid to be supplied to the treatment liquid deposition device; and a stirring device which stirs the treatment liquid in the treatment liquid tank.

By providing a stirring device inside the treatment liquid tank forming the device which accumulates the treatment liquid, and by stirring the treatment liquid inside the treatment liquid tank by means of this stirring device, it is possible to suppress aggregation and settling of the dispersed particles in the treatment liquid. Therefore, the storage stability of the treatment liquid can be improved.

In order to attain the aforementioned object, the present invention is also directed to an image forming method, comprising: a treatment liquid deposition step of depositing treatment liquid onto a recording medium, the treatment liquid containing a polymerization initiator, electrorheological property introducing particles introducing electrorheological properties, and a solvent, the electrorheological property introducing particles and the solvent both being made of materials that are colorless and transparent and have mutually proximate refractive indices; an electric field application step of applying an electric field to the treatment liquid having been deposited on the recording medium; an ink ejection step of ejecting ejects ink toward the recording medium on which the treatment liquid has been deposited, the ink containing a coloring material and a radiation-curable polymerizable compound; and a radiation irradiation step of irradiating radiation to cure the ink having been deposited on the recording medium.

In order to attain the aforementioned object, the present invention is also directed to an ink set, comprising: a treatment liquid which contains a polymerization initiator, electrorheological property introducing particles introducing electrorheological properties, and a solvent, the electrorheological property introducing particles and the solvent both being made of materials that are colorless and transparent and have mutually proximate refractive indices; and an ink which contains a coloring material and a radiation-curable polymerizable compound.

According to the present invention, it is possible to make a treatment liquid (first treatment liquid) remain on the medium of high permeability, by means of an electrorheological effect, and hence it is possible to cause the two liquids to mix together reliably, regardless of the type of recording medium. By irradiating radiation onto the mixed liquid, it is possible to achieve reliable curing and fixing, as well as high-quality image formation.

Furthermore, in the composition of the treatment liquid, the solvent and the dispersed particles (particles introducing electrorheological properties) are both made of materials which are colorless and transparent and have mutually proximate refractive indices. Therefore, it is possible to prevent the treatment liquid from becoming clouded, and hence the treatment liquid can be made transparent. Consequently, the colors of the ink can be reproduced faithfully.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

First Embodiment

General Composition of Inkjet Recording Apparatus

Figure 1:
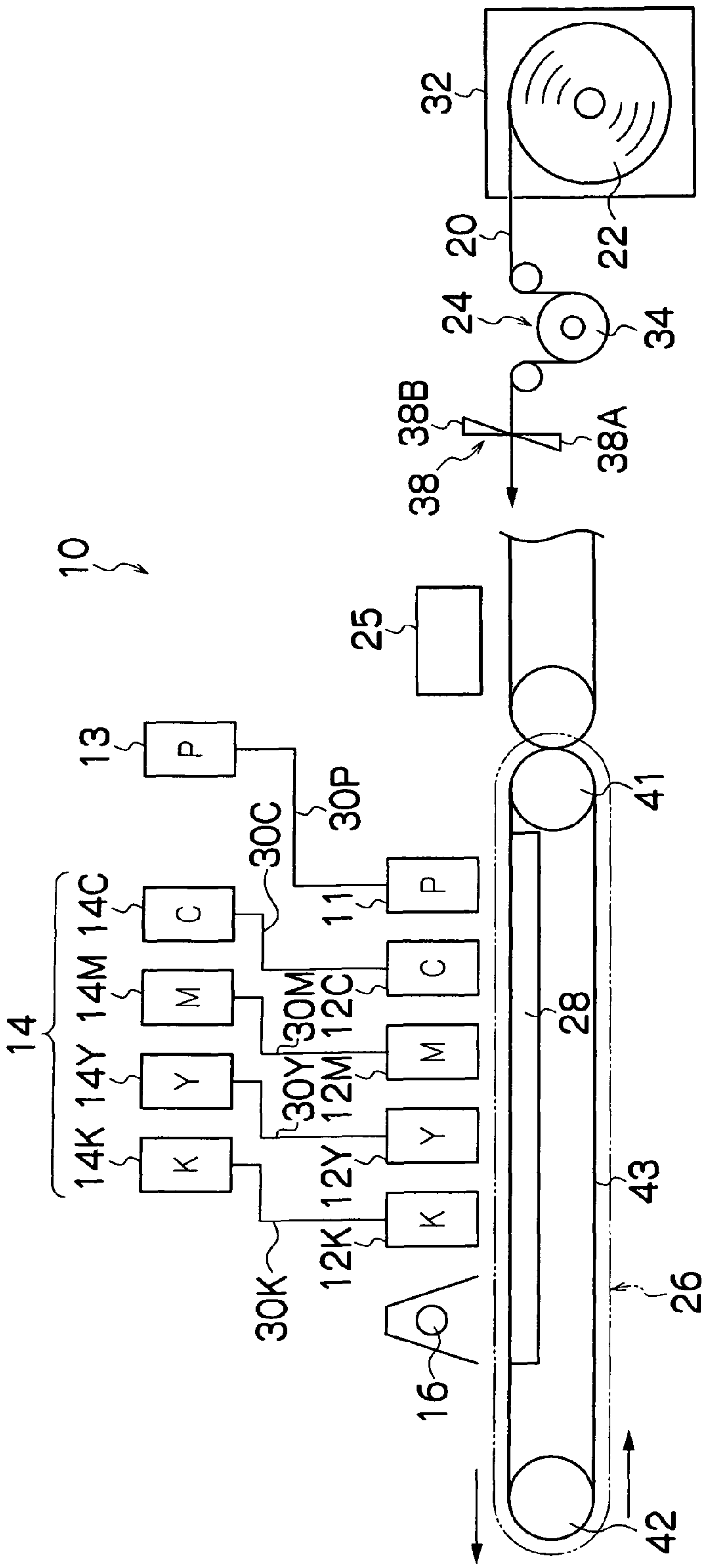
FIG. 1 is a general compositional diagram of an inkjet recording apparatus according to a first embodiment of the present invention.

FIG. 1 is a general schematic drawing of an inkjet recording apparatus 10 which forms a first embodiment of an image forming apparatus according to the present invention. As shown in FIG. 1, the inkjet recording apparatus 10 comprises: a treatment liquid head 11 (corresponding to a "treatment liquid deposition device"), which ejects a first liquid serving as a treatment liquid (pre-treatment liquid); a plurality of ink ejection heads (corresponding to "ink ejection devices"; hereinafter referred to as "ink heads") 12C, 12M, 12Y and 12K, provided respectively to correspond to the inks (second liquids) of colors of cyan (C), magenta (M), yellow (Y), black (K); a treatment liquid storing and loading unit 13, which stores the treatment liquid to be supplied to the treatment liquid head 11; an ink storing and loading unit 14, which stores the inks to be supplied to the ink heads 12C, 12M, 12Y and 12K; an ultraviolet light source (corresponding to a "radiation irradiation device"; hereinafter referred to as "ultraviolet light source") 16 forming a fixing promotion device; a medium supply unit 22, which supplies a recording medium 20; a decurling unit 24, which removes curl from the recording medium 20; a medium type determination unit (corresponding to a "recording medium type identification device") 25, which determines the type of recording medium 20; a conveyance unit 26, disposed facing the ejection surface (nozzle surface) of the heads 11, 12C, 12M, 12Y and 12K, and the light emission surface of the ultraviolet light source 16, which conveys the recording medium while keeping the medium flat; and an electrode unit (corresponding to an "electric field application device") 28, attached to the conveyance unit 26, which applies an electric field to the liquid on the recording medium 20.

The treatment liquid storing and loading unit 13 has a treatment liquid tank for storing the treatment liquid, and the treatment liquid tank is connected to the treatment liquid head 11 through a tubing channel 30P. The treatment liquid storing and loading unit 13 has a warning device (for example, a display device or an alarm sound generator) for warning when the remaining amount of the treatment liquid is low, and has a mechanism for preventing loading errors between types of liquid.

The ink storing and loading unit 14 has ink tanks 14C, 14M, 14Y and 14K for storing the inks of the colors corresponding to the respective ink heads 12C, 12M, 12Y and 12K, and the tanks are connected to the heads 12C, 12M, 12Y and 12K, through prescribed channels 30C, 30M, 30Y and 30K. The ink storing and loading unit 14 has a warning device (for example, a display device or an alarm sound generator) for warning when the remaining amount of any ink is low, and has a mechanism for preventing loading errors among the colors.

In the present embodiment, an electrorheological fluid having electrorheological properties is used for the first liquid serving as the treatment liquid. An electrorheological fluid is a fluid in which the apparent viscosity increases instantaneously when an electric field is applied. The change in viscosity is reversible by switching the electric field on and off. There are two types of electrorheological fluids: particle-dispersed fluids and homogeneous fluids.

A particle-dispersed fluid is one in which dielectric micro-particles are dispersed in an electrically insulating solvent. This fluid behaves in such a manner that when no electric field is applied, the micro-particles remain in a dispersed state and the viscosity of the fluid is low, but when an electric field is applied, the polarized particles form chain-like structures ("bridges") linked in the direction of the electric field, and these bridges act so as to increase the viscosity of the fluid. Particle-dispersed electrorheological fluids include aqueous and non-aqueous fluids.

Homogeneous electrorheological fluids are fluids having anisotropic properties in which molecules or domains are oriented in the direction of the electric field, such as in liquid crystals, or the like. Since homogeneous electrorheological fluids currently display little change in viscosity, it is thought that particle-dispersed electrorheological fluids are more suitable for use in inkjet printers.

In the present embodiment, a treatment liquid is imparted with electrorheological properties, and a treatment liquid of this kind may be manufactured, for example, by dispersing solid micro-particles (silica gel, starch, dextrin, carbon, gypsum, gelatin, alumina, cellulose, mica, zeolite, kaolite, or the like) in a liquid containing at least a polymerization initiator, by using micro-particles (particles formed into micro-capsules, or the like), providing insulation on the surface thereof, as a dispersant for introducing electrorheological properties, or by combining a homogeneous electrorheological fluid, or the like.

Here, for the first liquid or the treatment liquid, a transparent treatment liquid (which contains no coloring material) containing "a polymerization initiator, a coloring material dispersion inhibitor, an oil acting as a high-boiling-point organic solvent, and particles that introduce electrorheological properties (hereinafter referred to as "electrorheological property introducing particles")" is used.

Furthermore, for the second liquids or the inks, inks having a liquid composition containing "an ultraviolet-curable polymerizable compound (monomer, oligomer, or the like), and a pigment forming a coloring material" are used, in equal number to the number of colors used (in the present embodiment, four colors of C, M, Y and K). The details of the ink set used in the present embodiment are described below.

When the ink and the treatment liquid mix together, the dispersion of the coloring material in the ink is suppressed by the coloring material dispersion inhibitor in the treatment liquid, and the polymerization reaction of the liquids progresses due to the mixing of the two liquids and the irradiation of the radiation onto the mixed liquids, thereby curing and fixing the ink.

It is possible to adjust the curing speed and the physical properties of the liquids (surface tension, viscosity, and the like) by adjusting the respective compositions, component densities, and the like, of the ink and treatment liquid, and hence prescribed fixing properties of the ink (curing speed, fixing speed, and the like) can be achieved.

In FIG. 1, a magazine 32 for rolled paper (continuous paper) is shown as an example of the medium supply unit 22; however, a plurality of magazines 32 with papers of different paper width and quality may be jointly provided. Moreover, papers may be supplied in cassettes that contain cut papers loaded in layers and that are used jointly or in lieu of magazines for rolled papers.

The recording medium 20 delivered from the medium supply unit 22 retains curl due to having been loaded in the magazine 32. In order to remove the curl, heat is applied to the recording medium 20 in the decurling unit 24 by a heating drum 34 in the direction opposite from the curl direction in the magazine 32. The heating temperature at this time is preferably controlled so that the recording medium 20 has a curl in which the surface on which the print is to be made is slightly round outward.

In the case of the configuration in which roll paper is used, a cutter 38 is provided as shown in FIG. 1, and the continuous paper is cut into a desired size by the cutter 38. The cutter 38 has a stationary blade 38A, whose length is not less than the width of the conveyor pathway of the recording medium 20, and a round blade 38B, which moves along the stationary blade 38A. The stationary blade 38A is disposed on the reverse side of the printed surface of the recording medium 20, and the round blade 38B is disposed on the printed surface side across the conveyor pathway. When cut papers are used, the cutter 38 is not required.

After decurling in the decurling unit 24, the cut recording medium 20 is delivered to the conveyance unit 26. The medium type determination unit 25 is disposed at a suitable position in the conveyance path of the recording medium 20, in a stage before the treatment liquid ejection head 11 (on the upstream side in the recording medium conveyance path). This medium type determination unit 25 is a device which acquires information relating to the medium type, and it is constituted by a device which determines the paper type, wettability, size, and the like, of the recording medium 20 (for example, it is a sensor which determines the optical reflectivity of the paper, a paper width determination sensor, a sensor which determines the thickness of the paper, or a suitable combination of these). The type of recording medium 20 is judged automatically by the medium type determination unit 25, and control is implemented in such a manner that suitable treatment liquid deposition, control of the electric field and ink ejection are achieved, in accordance with the medium type.

The device which acquires information relating to the medium type is not limited to the composition described above. For example, it is also possible to adopt a composition in which an information recording body, such as a barcode or radio tag, which records medium type information, is attached to the magazine 32 of the medium supply unit 22, and the type of medium used is identified automatically by reading in the information of this information recording body by means of a prescribed reading apparatus (information reading device). Furthermore, it is also possible to adopt a composition in which recording medium information relating to the paper type, wettability, size, or the like, is specified by means of an input made through a prescribed user interface, instead of or in conjunction with such automatic determination devices.

The conveyance unit 26 has a configuration in which a minimally conductive endless belt 43 is set around rollers 41 and 42 in such a manner that at least the portion of the endless belt 43 facing the nozzle faces of the heads 11, 12C, 12M, 12Y and 12K forms a horizontal plane (flat plane).

The minimally conductive belt 43 has a broader width than the recording medium 20, and the electrode unit 28 is disposed on the rear side of the portion of the belt which supports the recording medium 20. Although described in more detail below, by applying a DC high voltage to the electrode unit 28 by means of a DC high-voltage generator 78 (not shown in FIG. 1, but shown in FIG. 7), the recording medium 20 is attracted to and held on the minimally conductive belt 43 due to an electrostatic force, and an electric field is applied to the treatment liquid and the ink deposited on the recording medium 20.

The minimally conductive belt 43 is driven in the counterclockwise direction in FIG. 1 by means of the motive force of a motor 138 (not shown in FIG. 1, but shown in FIG. 9) being transmitted to at least one of the rollers 41 and 42, which the belt 43 is set around, and the recording medium 20 is thus conveyed from right to left in FIG. 1.

The treatment liquid head 11 and the ink heads 12C, 12M, 12Y and 12K are full line heads having a length corresponding to the maximum width of the recording medium 20 used with the inkjet recording apparatus 10, and comprising a plurality of nozzles (ejection ports) arranged on a nozzle face through a length exceeding at least one edge of the maximum-size recording medium 20 (namely, the full width of the printable range).

The ink heads 12C, 12M, 12Y and 12K are arranged in color order (cyan (C), magenta (M), yellow (Y), black (K)) from the upstream side in the delivery direction of the recording medium 20, and these ink heads 12C, 12M, 12Y and 12K are fixed extending in a direction substantially perpendicular to the conveyance direction of the recording medium 20.

A color image can be formed on the recording medium 20 by ejecting inks of different colors from the ink heads 12C, 12M, 12Y and 12K, respectively, onto the recording medium 20 while the recording medium 20 is conveyed at a uniform speed by the conveyance unit 26.

By adopting a configuration in which full line heads 12C, 12M, 12Y and 12K having nozzle rows covering the full paper width are provided for the separate colors in this way, it is possible to record an image on the full surface of the recording medium 20 by performing just one operation of moving the recording medium 20 relatively with respect to the heads 12C, 12M, 12Y and 12K in the paper conveyance direction (the sub-scanning direction), (in other words, by means of one sub-scanning action). The single-pass inkjet recording apparatus 10 of this kind is able to print at high speed in comparison with a shuttle scanning system in which an image is printed by moving a recording head back and fourth reciprocally in the main scanning direction, and hence print productivity can be improved.

Although a configuration with four standard colors, C M Y and K, is described in the present embodiment, the combinations of the ink colors and the number of colors are not limited to these, and light and/or dark inks, or special color inks can be added as required. For example, a configuration is possible in which heads for ejecting light-colored inks such as light cyan and light magenta are added. Furthermore, there are no particular restrictions of the sequence in which the heads of respective colors are arranged.

The ultraviolet light source 16 disposed at a downstream stage of the ink head 12K of the last color has a length corresponding to the maximum width of the recording medium 20, similarly to the heads 11, 12C, 12M, 12Y and 12K, and is fixed extending in a direction substantially perpendicular to the conveyance direction of the recording medium 20. An ultraviolet lamp, for example, is used as the ultraviolet light source 16, and it irradiates ultraviolet light for promoting the curing of the ink having been deposited on the recording medium 20. Instead of the ultraviolet lamp, it is also possible to use a composition in which ultraviolet light-emitting diode (LED) elements or ultraviolet laser diode (LD) elements are arranged in a line shape. According to this composition, since light emission can be controlled selectively in each individual light-emitting element, it is possible readily to adjust the number of light emitting elements that light up, and the amount of light generated, and hence a prescribed irradiation range and light volume (intensity) can be achieved in the ultraviolet irradiation area.

A mode may also be adopted in which the ink droplets having been deposited on the recording medium 20 are not necessarily cured and fixed completely (to a state where the curing reaction has completed fully), but rather the ultraviolet light source 16 cures and fixes the ink droplets to a level whereby no image degradation occurs in subsequent handling, and a step of performing full curing is performed separately, as a later step. Here, this "handling" means, for example, (1) rubbing of the image surface against the rollers, conveyance guides, and the like, in the conveyance steps downstream of the ultraviolet light source 16, (2) rubbing between prints in the print stacking section, and (3) rubbing of a finished print against various objects when it is actually handled for use.

In this way, the recording medium 20 which has passed under the ultraviolet light source 16 (the generated printed object) is outputted from the paper output unit, by means of a toothed idle roller (not illustrated) and a nip roller, or the like. Although not shown in FIG. 1, the paper output unit is provided with a sorter for collecting images according to print orders.

The electrode unit 28 attached to the conveyance unit 26 is disposed at least in a region which extends from the treatment liquid deposition start position of the treatment liquid head 11 to the ultraviolet light irradiation position of the ultraviolet light source 16, and it is able to generate an electric field in this region.

Structure of Heads

Next, the structure of the ink heads 12C, 12M, 12Y and 12K is described. The heads provided for the respective ink colors each have a common structure, and a reference numeral 50 is hereinafter designated to any of the ink heads 12C, 12M, 12Y and 12K.

Figure 2A:
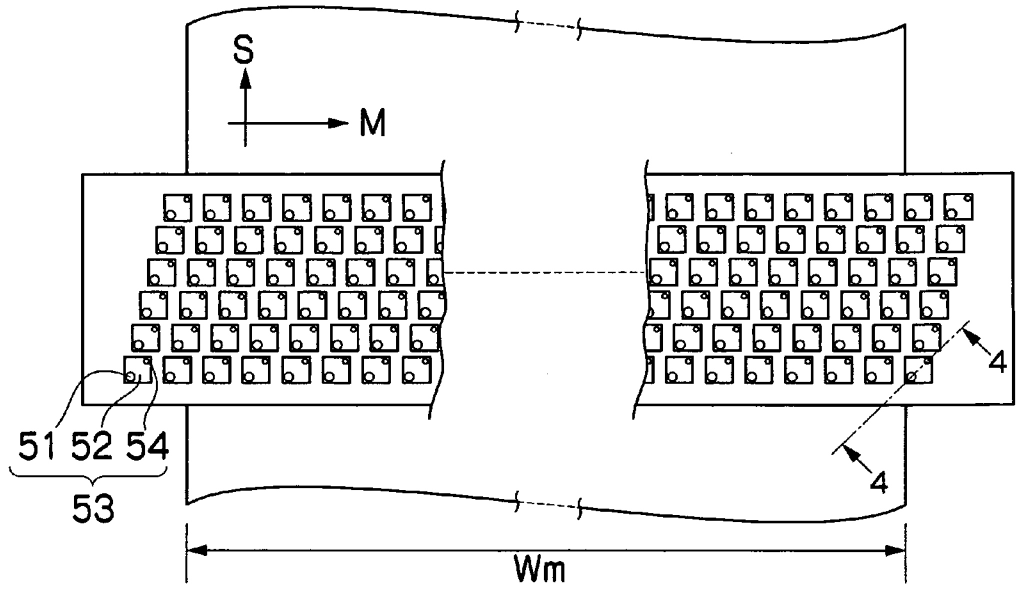
FIGS. 2A and 2B are plan view perspective diagrams showing an embodiment of the composition of an ink head.
Figure 2B:
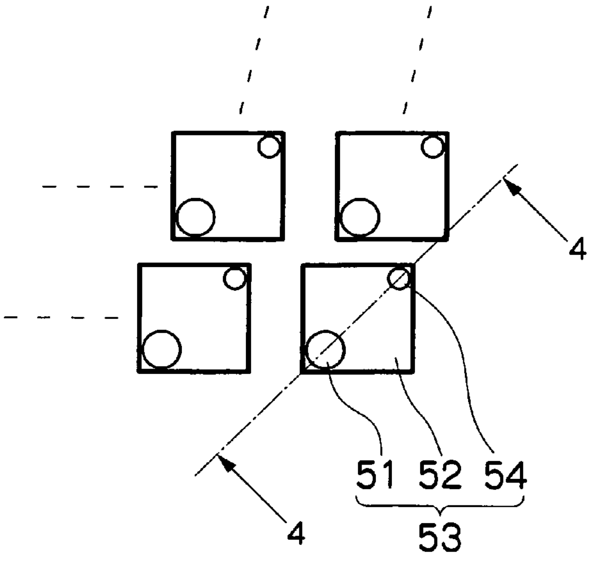

FIG. 2A is a plan view perspective diagram showing an example of the structure of an ink head 50, and FIG. 2B is an enlarged diagram of a portion of same. In order to minimize the pitch of the dots printed onto the surface of the recording medium 20, it is necessary to minimize the nozzle pitch in the ink head 50. As shown in FIGS. 2A and 2B, the ink head 50 according to the present embodiment has a structure in which a plurality of ink chamber units (droplet ejection elements) 53, each having a nozzle 51 forming an ink droplet ejection port, a pressure chamber 52 corresponding to the nozzle 51, and the like, are disposed two-dimensionally in the form of a staggered matrix, and hence the effective nozzle interval (the projected nozzle pitch) as projected in the lengthwise direction of the head (the direction perpendicular to the paper conveyance direction) is reduced (high nozzle density is achieved).

Figure 3:
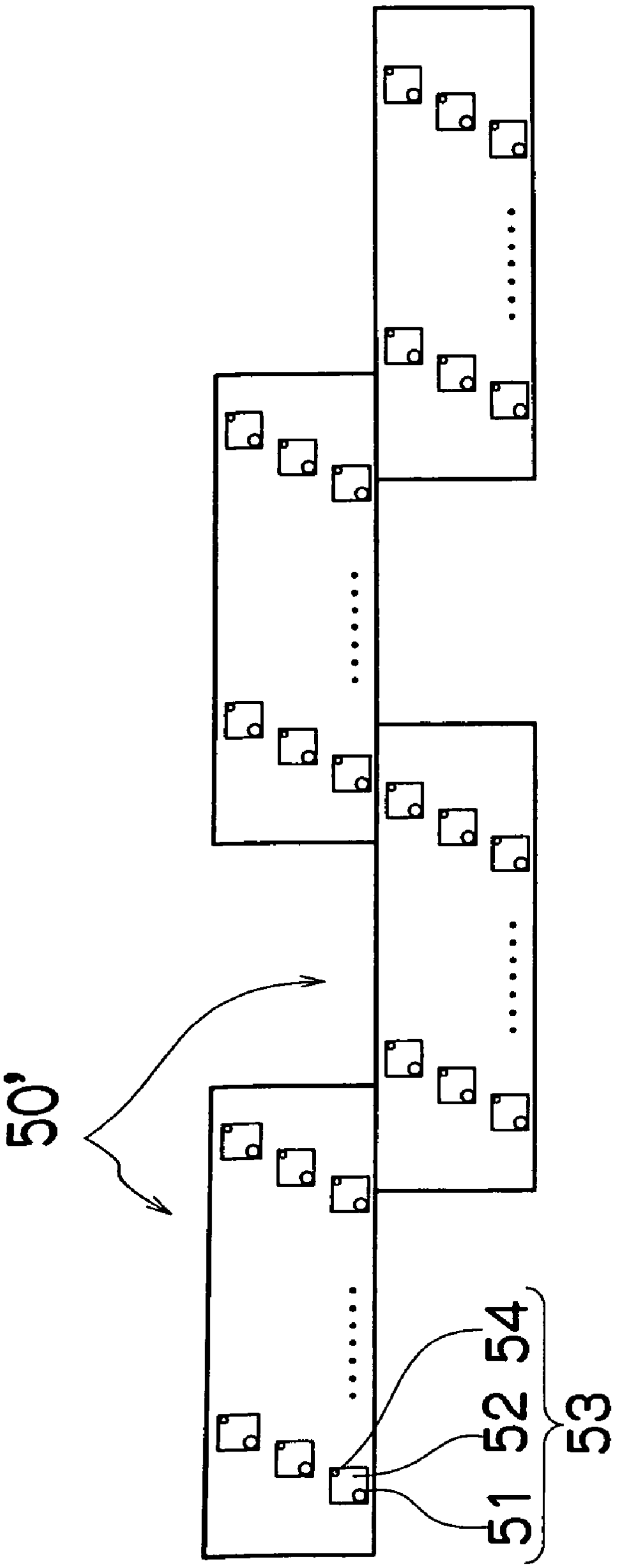
FIG. 3 is a plan view perspective diagram showing a further embodiment of the composition of a full line head.

The invention is not limited to the present embodiment of a mode for constituting nozzle rows equal to or exceeding a length corresponding to the full width Wm of the recording medium 20 in a direction (indicated by arrow M; main scanning direction) which is substantially perpendicular to the feed direction of the recording medium 20 (indicated by arrow S; sub-scanning direction). For example, instead of the composition in FIG. 2A, as shown in FIG. 3, a line head having nozzle rows of a length corresponding to the entire width of the recording medium 20 can be formed by arranging and combining, in a staggered matrix, short head units 50' each having a plurality of nozzles 51 arrayed in a two-dimensional fashion.

As shown in FIGS. 2A and 2B, the planar shape of the pressure chamber 52 provided for each nozzle 51 is substantially a square, and the nozzle 51 and an inlet for supplied ink (supply port) 54 are disposed in both corners on a diagonal line of the square. The shape of the pressure chamber 52 is not limited to that of the present embodiment and various modes are possible in which the planar shape is a quadrilateral shape (rhombic shape, rectangular shape, or the like), a pentagonal shape, a hexagonal shape, or other polygonal shape, or a circular shape, elliptical shape, or the like.

Figure 4:
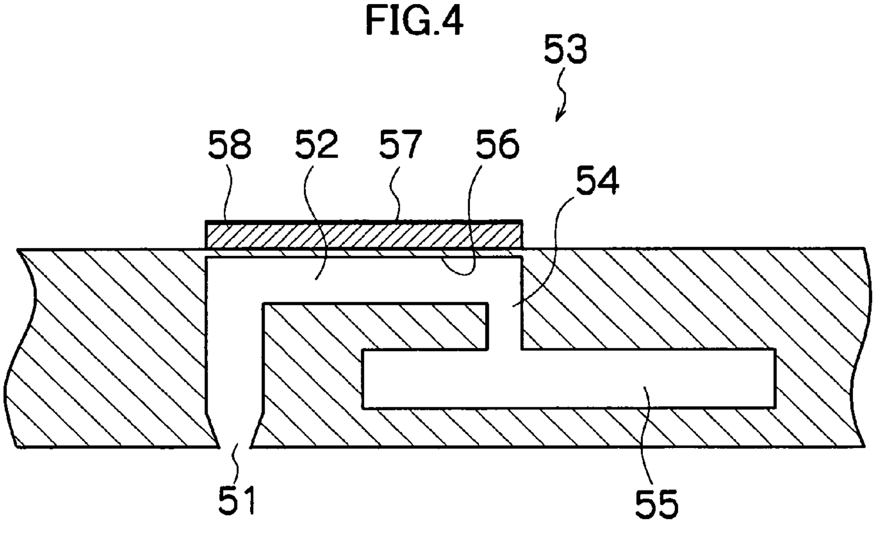
FIG. 4 is a cross-sectional diagram showing the three-dimensional composition of a droplet ejection element of one channel (an ink chamber unit corresponding to one nozzle)

FIG. 4 is a cross-sectional diagram (along line 4-4 in FIG. 2A) showing the three-dimensional composition of the droplet ejection element of one channel (an ink chamber unit corresponding to one nozzle 51). As shown in FIG. 4, each pressure chamber 52 is connected to a common flow channel 55 through the supply port 54. The common flow channel 55 is connected to an ink tank 60 (not shown in FIG. 4, but shown in FIG. 6), which is a base tank that supplies ink, and the ink supplied from the ink tank 60 is delivered through the common flow channel 55 shown in FIG. 4 to the pressure chambers 52.

An actuator 58 provided with an individual electrode 57 is bonded to a pressure plate (a diaphragm that also serves as a common electrode) 56 which forms the surface of one portion (in FIG. 4, the ceiling) of the pressure chambers 52. When a drive voltage is applied to the individual electrode 57 and the common electrode, the actuator 58 deforms, thereby changing the volume of the pressure chamber 52. This causes a pressure change which results in ink being ejected from the nozzle 51. For the actuator 58, it is possible to adopt a piezoelectric element using a piezoelectric body, such as lead zirconate titanate, barium titanate, or the like. When the displacement of the actuator 58 returns to its original position after ejecting ink, the pressure chamber 52 is replenished with new ink from the common flow channel 55 through the supply port 54.

Figure 5:
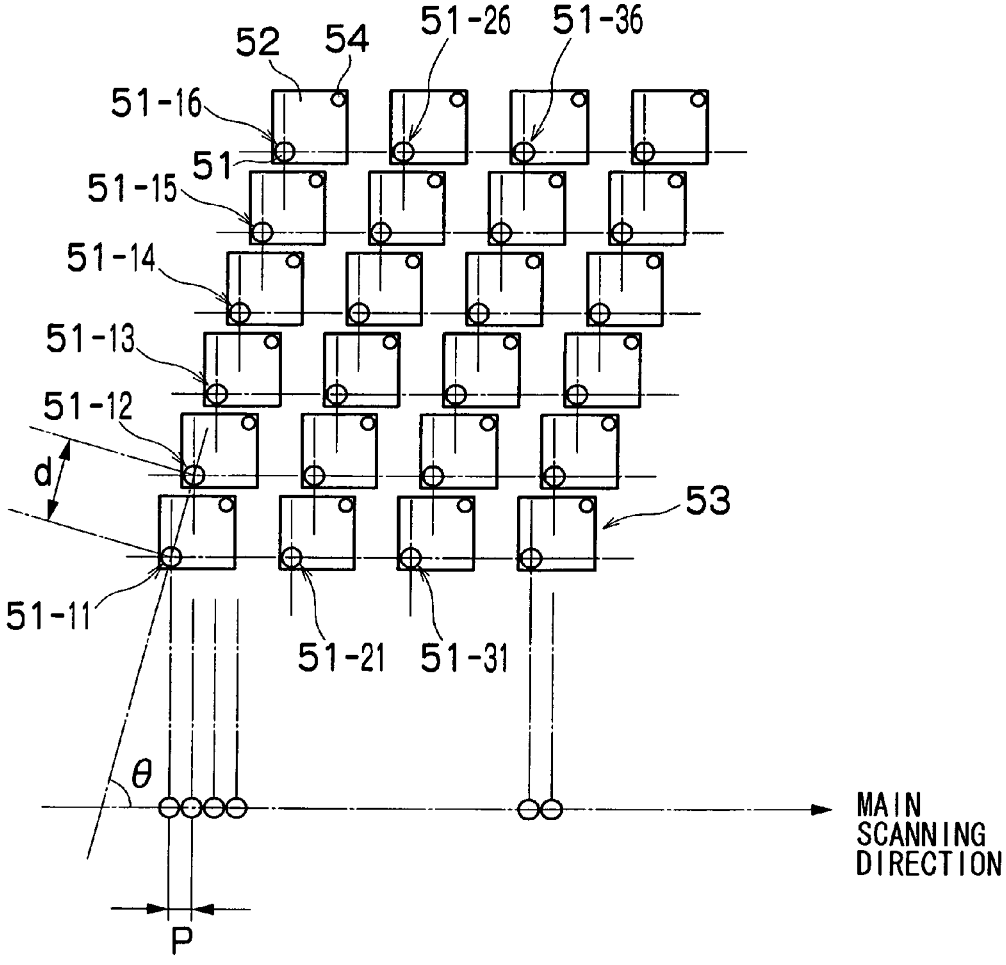
FIG. 5 is an enlarged view showing a nozzle arrangement in the ink head in FIGS. 2A and 2B.

As shown in FIG. 5, the high-density nozzle head according to the present embodiment is achieved by arranging a plurality of ink chamber units 53 having the above-described structure in a lattice fashion based on a fixed arrangement pattern, in a row direction which coincides with the main scanning direction, and a column direction which is inclined at a fixed angle of θ with respect to the main scanning direction, rather than being perpendicular to the main scanning direction.

More specifically, by adopting a structure in which a plurality of ink chamber units 53 are arranged at a uniform pitch d in line with a direction forming an angle of θ with respect to the main scanning direction, the pitch P of the nozzles projected so as to align in the main scanning direction is d×cos θ, and hence the nozzles 51 can be regarded to be equivalent to those arranged linearly at the fixed pitch P along the main scanning direction. Such configuration results in a nozzle row having a high nozzle density.

In a full-line head comprising rows of nozzles that have a length corresponding to the entire width of the image recordable width, the "main scanning" is defined as printing one line (a line formed of a row of dots, or a line formed of a plurality of rows of dots) in the width direction of the recording paper (the direction perpendicular to the conveyance direction of the recording paper) by driving the nozzles in one of the following ways: (1) simultaneously driving all the nozzles; (2) sequentially driving the nozzles from one side toward the other; and (3) dividing the nozzles into blocks and sequentially driving the nozzles from one side toward the other in each of the blocks.

In particular, when the nozzles 51 arranged in a matrix such as that shown in FIG. 5 are driven, the main scanning according to the above-described (3) is preferred. More specifically, the nozzles 51-11, 51-12, 51-13, 51-14, 51-15 and 51-16 are treated as a block (additionally; the nozzles 51-21, 51-22, . . . , 51-26 are treated as another block; the nozzles 51-31, 51-32, . . . , 51-36 are treated as another block; . . . ); and one line is printed in the width direction of the recording medium 20 by sequentially driving the nozzles 51-11, 51-12, . . . , 51-16 in accordance with the conveyance velocity of the recording medium 20.

On the other hand, "sub-scanning" is defined as to repeatedly perform printing of one line (a line formed of a row of dots, or a line formed of a plurality of rows of dots) formed by the main scanning, while moving the full-line head and the recording paper relatively to each other.

The direction indicated by one line (or the lengthwise direction of a band-shaped region) recorded by main scanning as described above is called the "main scanning direction", and the direction in which sub-scanning is performed, is called the "sub-scanning direction". In other words, in the present embodiment, the conveyance direction of the recording medium 20 is called the sub-scanning direction and the direction perpendicular to same is called the main scanning direction.

In implementing the present invention, the arrangement of the nozzles is not limited to that of the embodiment illustrated. Moreover, a method is employed in the present embodiment where an ink droplet is ejected by means of the deformation of the actuator 58, which is typically a piezoelectric element; however, in implementing the present invention, the method used for discharging ink is not limited in particular, and instead of the piezo jet method, it is also possible to apply various types of methods, such as a thermal jet method where the ink is heated and bubbles are caused to form therein by means of a heat generating body such as a heater, ink droplets being ejected by means of the pressure applied by these bubbles.

Although not illustrated here, the structure of the treatment liquid head 11 is generally the same as that of the ink head 50 described above. Since it is sufficient that the treatment liquid is deposited on the recording medium 20 in a substantially uniform (even) fashion in the region where ink droplets are to be deposited, then it is not necessary to form treatment liquid droplets to a high density, in comparison with the ink. Consequently, the treatment liquid head 11 may also be composed with a reduced number of nozzles (a reduced nozzle density) in comparison with the ink head 50 for ejecting ink. Furthermore, a composition may also be adopted in which the nozzle diameter of the treatment liquid head 11 is greater than the nozzle diameter of the ink head 50 for ejecting ink.

Configuration of Ink Supply System

Figure 6:
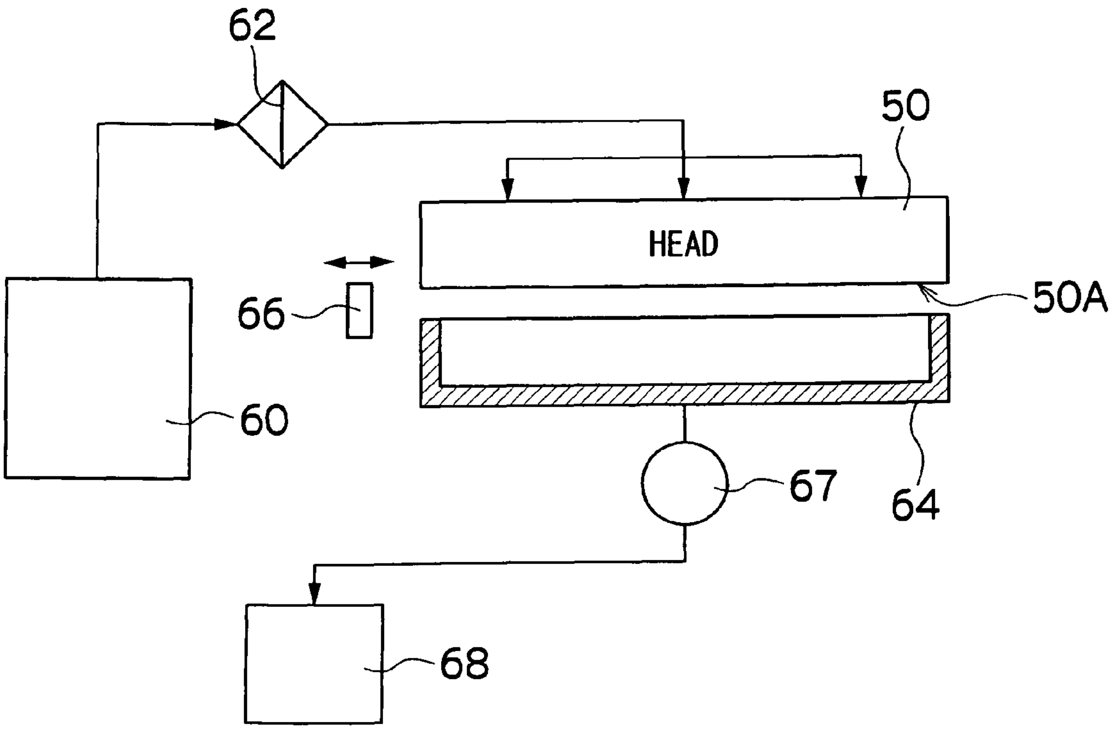
FIG. 6 is a schematic drawing showing the composition of an ink supply system in the inkjet recording apparatus.

FIG. 6 is a schematic drawing showing the configuration of the ink supply system in the inkjet recording apparatus 10. The ink tank 60 is a base tank that supplies ink to the ink head 50 and is set in the ink storing and loading unit 14 described with reference to FIG. 1. In other words, the ink supply tank 60 in FIG. 6 is equivalent to the ink storing and loading unit 14 in FIG. 1. The aspects of the ink tank 60 include a refillable type and a cartridge type: when the remaining amount of ink is low, the ink tank 60 of the refillable type is filled with ink through a filling port (not shown) and the ink tank 60 of the cartridge type is replaced with a new one. In order to change the ink type in accordance with the intended application, the cartridge type is suitable, and it is preferable to represent the ink type information with a bar code or the like on the cartridge, and to perform ejection control in accordance with the ink type.

A filter 62 for removing foreign matters and bubbles is disposed between the ink tank 60 and the ink head 50 as shown in FIG. 6. The filter mesh size in the filter 62 is preferably equivalent to or less than the diameter of the nozzle. Although not shown in FIG. 6, it is preferable to provide a sub-tank integrally to the ink head 50 or nearby the ink head 50. The sub-tank has a damper function for preventing variation in the internal pressure of the head and a function for improving refilling of the head.

The inkjet recording apparatus 10 is also provided with a cap 64 as a device to prevent the nozzles 51 from drying out or to prevent an increase in the ink viscosity in the vicinity of the nozzles 51, and a cleaning blade 66 as a device to clean the nozzle face 50A. A maintenance unit (restoring device) including the cap 64 and the cleaning blade 66 can be relatively moved with respect to the ink head 50 by a movement mechanism (not shown), and is moved from a predetermined holding position to a maintenance position below the ink head 50 as required.

The cap 64 is displaced up and down relatively with respect to the ink head 50 by an elevator mechanism (not shown). When the power of the inkjet recording apparatus 10 is turned OFF or when in a print standby state, the cap 64 is raised to a predetermined elevated position so as to come into close contact with the ink head 50, and the nozzle face 50A is thereby covered with the cap 64.

The cleaning blade 66 is composed of rubber or another elastic member, and can slide on the nozzle surface 50A (nozzle plate surface) of the ink head 50 by means of a blade movement mechanism (not shown). If there are ink droplets or foreign matter adhering to the nozzle plate surface, then the nozzle plate surface is wiped clean by causing the cleaning blade 66 to slide over the nozzle plate.

During printing or during standby, if the use frequency of a particular nozzle has declined and the ink viscosity in the vicinity of the nozzle has increased, or if the ink has degenerated, then a preliminary ejection is performed onto the cap 64 (which also serves as an ink receptacle), in order to remove the degraded ink.

If the ink head 50 continues in a state of not ejecting ink for a prescribed time or longer, then the viscosity of the ink in the vicinity of the nozzles increases, and it becomes impossible to eject ink from the nozzles 51, even if the actuators 58 for driving ejection are actuated. Therefore, before reaching such a state, the actuators 58 are operated toward an ink receptacle (while the ink viscosity is within a range that allows ejection by the operation of the actuators 58), and a "preliminary ejection" is performed which causes the ink in the vicinity of the nozzles whose viscosity has increased to be ejected. Furthermore, after cleaning away soiling on the surface of the nozzle surface 50A by means of a wiper, such as a cleaning blade 66, provided as a cleaning device on the surface of the nozzle plate, a preliminary ejection is also carried out in order to prevent infiltration of foreign matter into the nozzles 51 due to the rubbing action of the wiper. The preliminary ejection is also referred to as "dummy ejection", "purge", "liquid ejection", and so on.

On the other hand, if air bubbles become intermixed into the nozzle 51 or pressure chamber 52, or if the increase in the viscosity of the ink inside the nozzle 51 exceeds a certain level, then it may not be possible to eject ink in the preliminary ejection operation described above. In cases of this kind, a cap 64 forming a suction device is pressed against the nozzle surface 50A of the ink head 50, and the ink inside the pressure chambers 52 (namely, the ink containing air bubbles of the ink of increased viscosity) is suctioned by a suction pump 67. The ink suctioned and removed by means of this suction operation is sent to a recovery tank 68. The ink collected in the recovery tank 68 may be used, or if reuse is not possible, it may be discarded.

Since the suctioning operation is performed with respect to all of the ink in the pressure chambers 52, it consumes a large amount of ink, and therefore, desirably, preliminary ejection is carried out while the increase in the viscosity of the ink is still minor. The suction operation is also carried out when ink is loaded into the ink head 50 for the first time, and when the head starts to be used after being idle for a long period of time.

The supply system for the treatment liquid is substantially the same as the composition of the ink supply system shown in FIG. 6, and is not illustrated.

Structure of Electrode Unit

Figure 7:
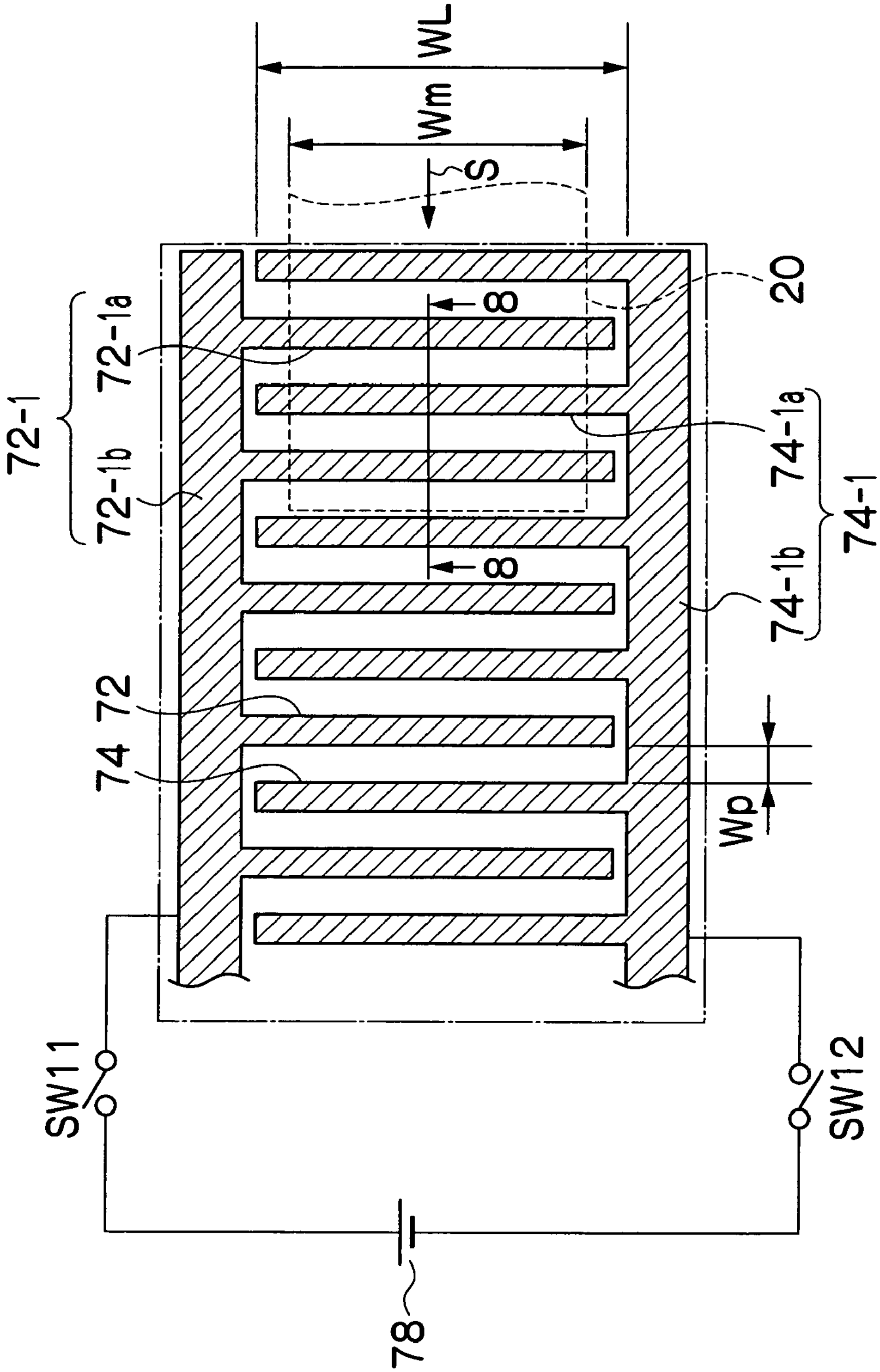
FIG. 7 is a plan view schematic drawing showing an embodiment of an electrode arrangement structure in an electrode unit.

FIG. 7 is a plan diagram showing an embodiment of the structure of an electrode arrangement in the electrode unit 28 described in FIG. 1. As shown in FIG. 7, the electrode unit 28 has a structure in which bar-shaped positive electrodes 72 and negative electrodes 74 extending substantially in parallel with a direction perpendicular to the conveyance direction of the recording medium 20 (direction S) are arranged alternately at a prescribed electrode pitch Wp in the medium conveyance direction. In FIG. 7, the number of electrodes is reduced and a schematic illustration is provided in order to simplify the drawing; however, a large number of electrodes are arranged in a dense configuration in practice.

The bar-shaped positive electrodes 72 and negative electrodes 74 are each formed to a longer dimension WL than the width Wm of the recording medium 20, in such a manner that they apply a uniform electric field to the treatment liquid deposited on the recording medium 20.

The electrode unit 28 has a pair of positive and negative electrode patterns 72-1 and 74-1, which are connected to a DC high-voltage generator 78 through the switches SW11 and SW12. The positive electrode pattern 72-1 has a comb shape in which one end (the upper end in FIG. 7) of each of a plurality of bar-shaped positive electrodes **72-1*a* is connected to a common base end electrode unit 72-1*b*. Similarly, the negative electrode pattern 74-1 has a comb shape in which one end (the lower end in FIG. 7) of each of a plurality of bar-shaped negative electrodes 74-1*a* is connected to a common base end electrode unit 74-1*b*. The positive electrode pattern 72-1 and the negative electrode pattern 74-1 are disposed in such a manner that the sides of the bar-shaped electrodes formed in comb shapes are positioned respectively alongside each other. The positive side base electrode section 72-1*b* is connected to the positive electrode of the DC high-voltage generator 78 through the switch SW11. The negative side base electrode section 74-1***b* is connected to the negative electrode of the DC high-voltage generator 78 through the switch SW12. A composition is adopted wherein, by controlling the switches SW11 and SW12, the application (ON) or non-application (OFF) of voltage is controlled.

Figure 8:
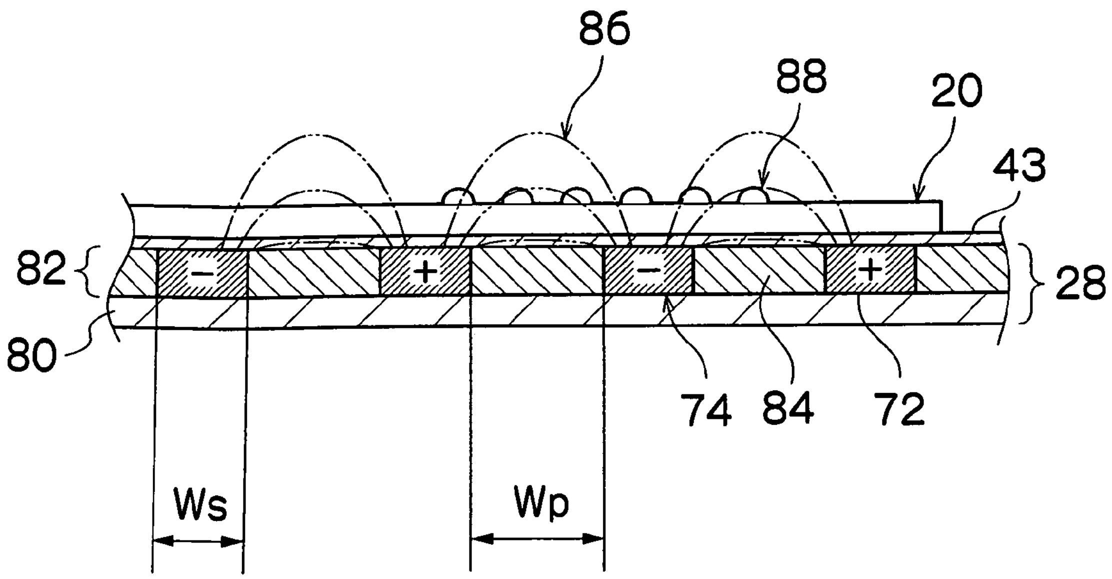
FIG. 8 is a cross-sectional view along line 8-8 in FIG. 7.

FIG. 8 is a cross-sectional view along line 8-8 in FIG. 7. As shown in FIG. 8, the electrode unit 28 is positioned below the minimally conductive belt 43, which supports the recording medium 20. The electrode unit 28 forms a layered structure in which an electrode layer 82 is provided on top of an insulating supporting layer 80. The positive and negative electrodes 72 and 74 described in FIG. 7 are formed within the same plane in the electrode layer 82. Furthermore, the spaces between the electrodes 72 and 74 in the electrode layer 82 are filled with an insulating material 84, thereby providing an electrical insulation between the electrodes.

The minimally conductive belt 43 covers the upper surface of the electrode unit 28 and makes contact with the rear surface of the recording medium 20. Desirably, the electrical resistivity of the minimally conductive belt 43 is approximately $10^8$ Ohm/cm to $10^{12}$ Ohm/cm. Furthermore, desirably, the thickness of the minimally conductive belt 43 is approximately 0.01 mm to 10 mm.

The minimally conductive belt 43 covers the surface of the electrode layer 82 adjacent to the recording medium 20, and serves to prevent human injury resulting from electrical shock, or the like, as well as protecting the positive and negative electrodes 72 and 74. Furthermore, the minimally conductive belt 43 is prevented from remaining in a charged state when no printing operation is being performed, in other words, when the power supply is switched off.

When a prescribed voltage from the DC high-voltage generator 78 shown in FIG. 7 is applied between the electrodes 72 and 74, an electric field is generated between the adjacent electrodes 72 and 74, as shown in FIG. 8. In FIG. 8, the lines of electric force 86 of the electric field generated in this case are shown by double-dotted broken lines. As shown in FIG. 8, the lines of electric force 86 of the electric field created between mutually adjacent electrodes 72 and 74 form approximately arc-shaped lines, and an electric field is also created above the print surface of the recording medium 20. Consequently, an electric field is applied to the treatment liquid 88 having been deposited on the recording medium 20. In this case, a minimal current flows through the treatment liquid 88 deposited on the recording medium 20, through the minimally conductive belt 43 and the recording medium 20. An electrorheological effect is thus produced in the treatment liquid 88 deposited on the recording medium 20, thereby increasing the viscosity of the deposited treatment liquid 88. This state of increased viscosity due to the aforementioned electrorheological effect is sustained while the electric field continues to be applied. Accordingly, the deposited treatment liquid droplet is maintained in a liquid state in a substantially hemispherical shape on the recording medium 20, and its permeation into the recording medium 20, landing interference, bleeding, or the like, are suppressed.

In the present embodiment, the intensity of the electric field applied to the recording medium 20 is dependent on the electrode pitch Wp between the adjacently disposed positive electrodes 72 and negative electrodes 74, and the voltage applied between the electrodes. At a constant applied voltage, the smaller the electrode pitch Wp, the greater the intensity of the electric field at the recording medium 20. Consequently, from the viewpoint of reducing the applied voltage, it is desirable that the electrode pitch Wp should be small, and more desirable that it should be approximately 0.1 mm to 20 mm.

Furthermore, the smaller the thickness of the electrodes 72 and 74 (namely, electrode width) Ws, the evener (substantially uniform) the intensity distribution of the electric field created on the recording medium 20. Therefore, desirably, the electrode width Ws is small, and more desirably, it is approximately 0.01 mm to 10 mm.

Experimentation reveals that when the intensity of the electric field applied to the recording medium 20 lies within the range of 0.1 kV/mm to 10 kV/mm, a large electrorheological effect is obtained with respect to the treatment liquid droplets deposited on the recording medium 20. Therefore, desirably, the electrode pitch Wp, electrode width Ws and applied voltage are set in such a manner that the intensity of the electric field applied to the recording medium 20 lies in the range of 0.1 kV/mm to 10 kV/mm.

Description of Ink Set

Next, an ink set (of treatment liquid and inks) used in the inkjet recording apparatus 10 according to the present embodiment is described.

The inkjet recording apparatus 10 in the present embodiment uses an ink set comprising: a treatment liquid containing a polymerization initiator, a coloring material dispersion inhibitor, a high-boiling-point organic solvent and electrorheological property introducing particles; and inks of respective colors including a polymerizable compound and a coloring material.

The polymerizable compound includes a compound having a function of generating a polymerization reaction and curing, by means of initial seeds, such as radicals generated by the polymerization initiator, which is described below.

Desirably, the polymerizable compound is an addition-polymerizable compound having at least one ethylenically unsaturated double bond, and preferably, it is selected from a multi-functional compound having at least one, or two or more, terminal ethylenically unsaturated bonds. This group of compounds is widely known in the related industrial field, and such compounds can be used without any particular restrictions. This group includes compounds having various chemical forms, such as monomers, pre-polymers, in other words, dimers, trimers and oligomers, or mixtures of these, and copolymers of these.

Desirably, the polymerizable compound has a polymerizable group, such as an acryloyl group, a methacryloyl group, an allyl group, a vinyl group, an inner double bonding group (maleic acid), or the like, and of these, compounds containing an acryloyl group or a methacryloyl group are more desirable, since they can generate a curing reaction at low energy.

It is possible to use either one type of polymerizable compound only, or two or more types of polymerizable compounds.

The content ratio of the polymerizable compound in the second liquid containing a coloring material (here, the second liquid serving as the ink of each color) is desirably in the range of 50 wt % to 99 wt % in the second liquid, more desirably, in the range of 70 wt % to 99 wt %, and even more desirably, in the range of 80 wt % to 99 wt %.

Here, the "polymerization initiator" indicates a compound which generates initial seeds, such as radicals, due to light energy, heat energy, or both light and heat energy, thereby starting and promoting the polymerization of the polymerizable compound, and it is possible to use selectively a commonly known thermal polymerization initiator, a compound or polymerization initiator having bonds of low bond dissasociation energy, or light polymerization initiator or the like.

As a radical generating agent of this kind, it is possible to use, for example, an organic halide compound, a carbonyl compound, an organic peroxide compound, an azo type polymerization initiator, an azide compound, a metallocene compound, a hexaallyl biimidazole compound, an organic borate compound, a disulfonate compound, an onium compound, or the like.

In the ink set according to the present embodiment, of the plurality of types of liquids used, a polymerization initiator which causes curing of the polymerizable compound is contained in the first liquid serving as the treatment liquid (the pre-treatment liquid).

From the viewpoints of stability over time, curing characteristics, and curing speed, it is desirable that the content ratio of the polymerization initiator is 0.5 wt % to 20 wt % with respect to the total amount of polymerizable compound used in the ink set, and more desirably, 1 wt % to 15 wt %, and even more desirably, 3 wt % to 10 wt %.

For the polymerization initiator, it is possible to use one type of initiator, or a combination of two or more types of initiator. Furthermore, provided that the required beneficial effects are not impaired, it is also possible to use a commonly known sensitizing agent, conjointly, with the object of improving sensitivity.

There are no particular restrictions on the coloring material used in the present embodiment, and provided that it achieves a color hue and color density that matches the object of use of the ink, it is possible to select a coloring material appropriately from commonly known oil-based dyes and pigments.

There are no particular restrictions on the oil-based dyes which are usable in the present invention, and any desired oil-based dye may be used. Desirably, the content (converted to solid) ratio of the dye in a case where an oil-based dye is used as the coloring material is in the range of 0.05 wt % to 20 wt %, more desirably, 0.1 wt % to 15 wt %, and especially desirably, 0.2 wt % to 6 wt %.

A mode which uses a pigment as the coloring material is desirable from the viewpoint of enabling easy aggregation when mixing the plurality of types of liquids.

For the pigment used in the present embodiment, it is possible to use either an organic pigment or an inorganic pigment, and as regards a black pigment, a carbon black pigment, or the like, is desirable. Furthermore, in general, pigments of black, and three primary colors of cyan, magenta and yellow, are used; however, depending on the required objective, it is also possible to use pigments having color hues, such as red, green, blue, brown, white, or the like, or a metallic lustrous pigment, such as gold or silver, or a colorless or weakly colored body pigment, or the like.

Moreover, for a pigment, it is also possible to use particles having a core material including a particle of silica, alumina, or resin, with dye or pigment affixed to the surface thereof, or an insoluble lake compound of a dye, a colored emulsion, a colored latex, or the like.

Furthermore, it is also possible to use a pigment coated with a resin. This is called a micro-capsule pigment, and can be acquired as commercial products, from Dainippon Ink and Chemicals Incorporated, Toyo Ink Manufacturing Co., Ltd., and the like.

From the viewpoint of achieving a balance between optical density and stability during storage, it is desirable that the volume-average particle size of the pigment particles contained in the liquid of the present embodiment is in the range of 30 nm to 250 nm, and more desirably, 50 nm to 200 nm. Here, the volume-average particle size of the pigment particles can be measured by a measurement apparatus, such as LB-500 of Horiba, Ltd.

When a pigment is used as a coloring material, it is desirable from the viewpoint of optical density and ejection stability that the content (converted to solid) ratio is in the range of 0.1 wt % to 20 wt % in the second liquid (here, the second liquid serving as the ink of each color), and more desirably, in the range of 1 wt % to 10 wt %.

It is possible to use only one type of coloring material and it is also possible to combine two or more types of coloring material. Furthermore, it is possible to use different coloring materials or the same coloring material, for the respective liquids.

In the present embodiment, the coloring material dispersion inhibitor indicates a material contained in the first liquid, with the object of preventing the dispersion or bleeding of the second liquid having a coloring material (in other words, the second liquid serving as the ink) ejected in the form of droplets onto the first liquid that has been deposited on the recording medium (in other words, the first liquid serving as the treatment liquid).

For the coloring material dispersion inhibiting agent, at least one agent selected from a group including a polymer having an amino group, a polymer having an onium group, a polymer having a nitrogen-containing hetero ring, and a metal compound, is used.

It is possible to use only one type of polymer, and the like, or it is possible to combine a plurality of types of polymers. Here, “a plurality of types” includes, for example, a case of polymers which belong to the category of polymers having the same amino group, but which have different structures, or a case of polymers belonging to different types, such as a polymer having an amino group and a polymer having an onium group. Furthermore, it is also possible to make two or more of an amino group, an onium group, a nitrogen-containing hetero ring, and a metal compound coexist within the same molecule.

In the present embodiment, the high-boiling-point organic solvent (oil) means an organic solvent having a viscosity at 25° C. of 100 mPa·s or below or a viscosity at 60° C. of 30 mPa·s or below, and a boiling point above 100° C. Here, the viscosity is measured with a viscometer RE80 of Toki Sangyo Co., Ltd. The RE80 viscometer is based on a conical rotor/flat plate measurement system equivalent to an E type, and measurement is carried out using a Code No. 1 rotor, at a rotational speed of 10 rpm. In case of material having a viscosity greater than 60 mPa·s, according to requirements, measurement is carried out by changing the rotational speed to 5 rpm, 2.5 rpm, 1 rpm, 0.5 rpm, and the like.

Desirably, the amount of the high-boiling-point organic solvent used (converted to a coating amount) is 5 wt % to 2000 wt % and more desirably, 10 wt % to 1000 wt %.

In the ink set according to the present embodiment, it is possible to add a storage stabilizing agent, with the aim of suppressing unwanted polymerization during storage of the plurality of types of liquids. Desirably, a storage stabilizing agent is used by being contained in the same liquid as the polymerizable compound, and furthermore, desirably, a storage stabilizing agent that is soluble in the liquid or other components in which it is contained is used.

For the storage stabilizing agent, it is possible to use, a quaternary ammonium salt, a hydroxylamine, a cyclic amide, a nitrile, a substituted urea derivative, a complex ring compound, an organic acid, hydroquinone, hydroquinone monoether, an organic phosphine, a copper compound, or the like.

Desirably, the added amount of the storage stabilizing agent is adjusted suitably on the basis of the activity of the polymerization initiator used, the polymerization characteristics of the polymerizable compound, and the type of storage stabilizing agent, and it is desirable that the amount (in solid conversion) in the liquid is 0.005 wt % to 1 wt %, and more desirably, 0.01 wt % to 0.5 wt %, and even more desirably, 0.01 wt % to 0.2 wt %, from the viewpoint of achieving a balance between storage stability and curability of the ink when the liquids are mixed.

Description of Control System

Figure 9:
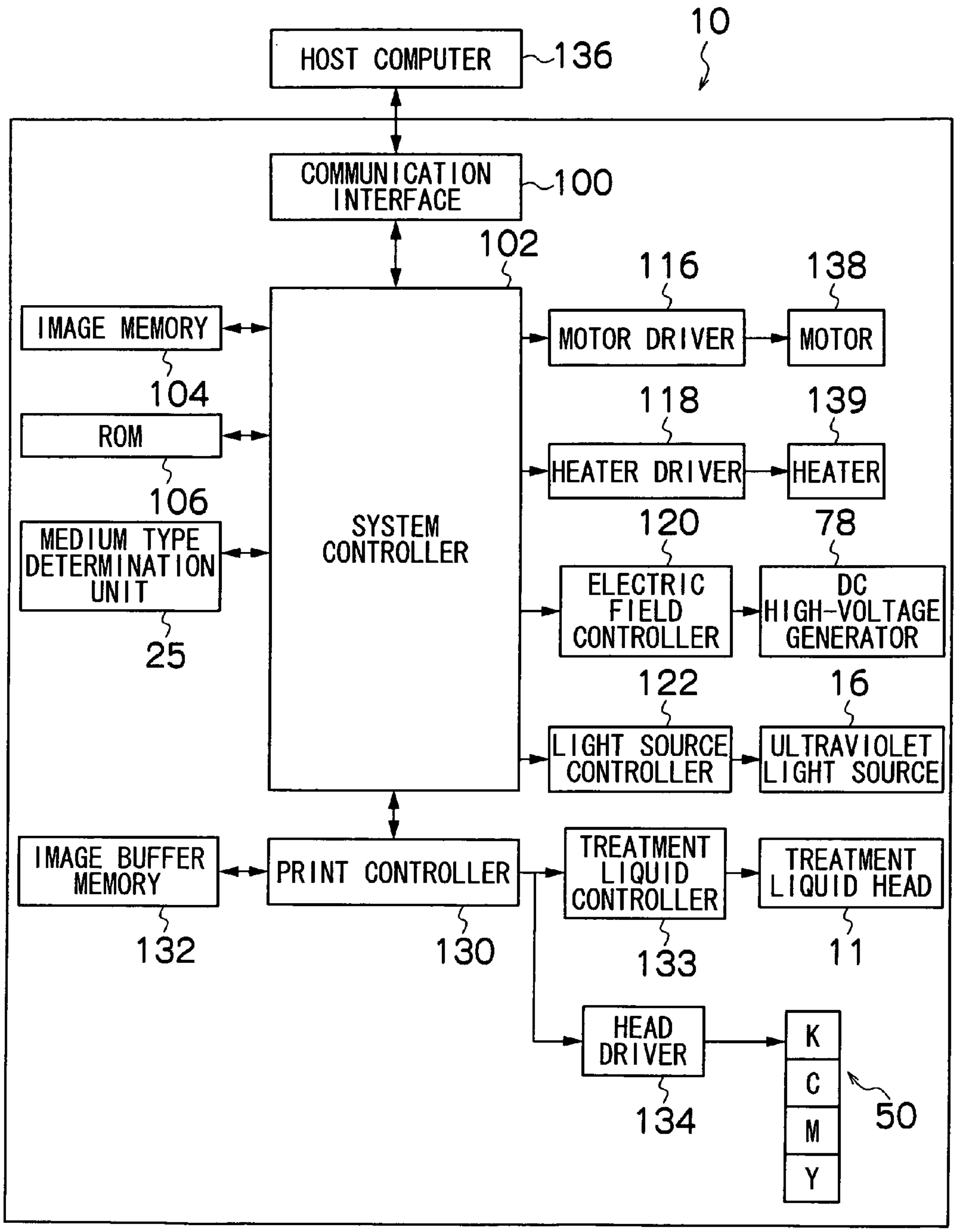
FIG. 9 is a principal block diagram showing the system configuration of the inkjet recording apparatus according to the first embodiment.

FIG. 9 is a principal block diagram showing the system composition of the inkjet recording apparatus 10. The inkjet recording apparatus 10 comprises a communication interface 100, a system controller 102, an image memory 104, a ROM 106, the medium type determination unit 25, a motor driver 116, a heater driver 18, an electric field controller 120, a light source controller 122, a print controller 130, an image buffer memory 132, a treatment liquid controller 133, a head driver 134, and the like.

The communication interface 100 is an interface unit (image input unit) which functions as an image input device for receiving image data transmitted by a host computer 136. For the communication interface 100, a serial interface, such as USB (Universal Serial Bus), IEEE 1394, an Ethernet (registered tradename), or a wireless network, or the like, or a parallel interface, such as a Centronics interface, or the like, can be used. It is also possible to install a buffer memory (not illustrated) for achieving high-speed communications.

The image data sent from the host computer 136 is received by the inkjet recording apparatus 10 through the communication interface 100, and is temporarily stored in the image memory 104. The image memory 104 is a storage device for temporarily storing images input through the communication interface 100, and data is written and read to and from the image memory 104 through the system controller 102. The image memory 104 is not limited to a memory composed of semiconductor elements, and a hard disk drive or another magnetic medium may be used.

The system controller 102 is constituted by a central processing device (CPU) and peripheral circuits thereof, and the like, and it functions as a control device for controlling the whole of the inkjet recording apparatus 10 in accordance with a prescribed program, as well as a calculation device for performing various calculations.

More specifically, the system controller 102 is a control unit which controls the various sections, such as the communication interface 100, image memory 104, motor driver 116, heater driver 118, electric field controller 120, light source controller 122, print controller 130, and the like, and as well as controlling communications with the host computer 136 and writing and reading to and from the image memory 104, it also generates control signals for controlling the motor 138 and heater 139 of the conveyance system.

The program executed by the CPU of the system controller 102 and the various types of data which are required for control procedures are stored in the ROM 106. The ROM 106 may be a non-rewriteable storage device, or it may be a rewriteable storage device, such as an EEPROM. The image memory 104 is used as a temporary storage region for the image data, and it is also used as a program development region and a calculation work region for the CPU.

As shown in FIG. 1, the medium type determination unit 25 acquires information relating to the medium type, and includes a device which determines the type, wettability, size, and the like, of the recording medium 20. Furthermore, alternatively, it is also possible to adopt a composition in which information relating to the paper type, size, or the like, is specified by means of an input through a prescribed user interface, instead of or in conjunction with a sensor, or the like.

The information obtained by the medium type determination unit 25 is sent to the system controller 102 in FIG. 9. The system controller 102 calculates the on and off switching of the electric field, control target values for electric field application, and control target values for ultraviolet light irradiation, on the basis of the information obtained from the medium type determination unit 25, and the image data for printing, and it controls the electric field controller 120 and the light source controller 122 in accordance with the calculation results.

The motor driver 116 is a driver (drive circuit) which drives the motor 138 in accordance with instructions from the system controller 102. The heater driver 118 is a driver for driving the heater 139 of the heating drum 34 (see FIG. 1), and other sections, in accordance with instructions from the system controller 102.

The electric field controller 120 in FIG. 9 controls the voltage generated by the DC high-voltage generator 78 in accordance with instructions from the system controller 102, as well as outputting control signals for switching the switches SW11 and SW12 shown in FIG. 7 on and off, and controlling the application or non-application of the electric field by the electrode unit 28 (see FIGS. 1, 7 and 8), and the electric field intensity when the electric field is applied. More specifically, in the present embodiment, the combination of the electric field controller 120 and the system controller 102 in FIG. 9 corresponds to the “electric field control device”.

The light source controller 122 in FIG. 9 comprises a light source control circuit for controlling the on/off operation, the lighting position, and the amount of light generated in the ultraviolet light source 16. The light source controller 122 controls light emission by the ultraviolet light source 16 in accordance with instructions from the system controller 102.

The print controller 130 functions as a signal processing device which performs corrections and other types of processing in order to generate a signal for controlling ink ejection and a signal for controlling treatment liquid ejection, from the image data in the image memory 104 (multiple-value input image data), in accordance with the control implemented by the system controller 102. Furthermore, the print controller 130 functions as an ink ejection control device which controls the ejection driving of the ink heads 50 by supplying the generated ink ejection data to the ink head driver 134, as well as functioning as a treatment liquid deposition control device which controls the ejection operation of the treatment liquid head 11 by generating data for treatment liquid ejection in conjunction with the treatment liquid controller 133.

The head driver 134 drives the actuators 58 which drive ejection in the respective heads 50, on the basis of the ink ejection data supplied from the print controller 130. A feedback control system for maintaining constant drive conditions for the print heads may be included in the head driver 134.

Prescribed signal processing is applied to the input image data in the print controller 130, and the treatment liquid ejection volume and ejection timing of the treatment liquid head 11 are controlled by means of the treatment liquid controller 133, and the ink ejection volume and ejection timing of the ink heads 50 of the respective colors are controlled by means of the head driver 134, on the basis of the image data. By this means, prescribed dot size and dot positions can be achieved.

The print controller 130 is provided with the image buffer memory 132; and image data, parameters, and other data are temporarily stored in the image buffer memory 132 when image data is processed in the print controller 130. The aspect shown in FIG. 9 is one in which the image buffer memory 132 accompanies the print controller 130; however, the image memory 104 may also serve as the image buffer memory 132. Also possible is an aspect in which the print controller 130 and the system controller 102 are integrated to form a single processor.

To give a general description of the sequence of processing from image input to print output, image data to be printed (original image data) is input from an external source through a communication interface 100, and is accumulated in the image memory 104. At this stage, multiple-value RGB input image data is stored in the image memory 104, for example.

In the inkjet recording apparatus 10, an image which appears to have a continuous tonal gradation to the human eye is formed by changing the droplet ejection density and the dot size of fine dots created by ink (coloring material), and therefore, it is necessary to convert the input digital image into a dot pattern which reproduces the tonal gradations of the image (namely, the light and shade toning of the image) as faithfully as possible. Therefore, original image data (RGB data) stored in the image memory 104 is sent to the print controller 130 through the system controller 102, and is converted to the dot data (droplet ejection arrangement data) for each ink color by a halftoning technique, using dithering, error diffusion, or the like.

In other words, the print controller 130 performs processing for converting the input RGB image data into dot data for the four colors of C, M, Y and K. The dot data generated by the print controller 130 in this way is stored in the image buffer memory 132. This dot data of the respective colors is converted into C, M, Y, K droplet ejection data for ejecting inks from the nozzles of the ink heads 50, thereby establishing the ink ejection data to be printed.

The ink head driver 134 outputs drive signals for driving actuators 58 corresponding to the respective nozzles 51 of the ink heads 50 on the basis of the ink ejection data supplied by the print controller 130.

Similarly, the treatment liquid controller 133 outputs drive signals for driving the actuators corresponding to the respective nozzles of the treatment liquid head 11, on the basis of the treatment liquid ejection data generated from the image data (treatment liquid dot data generated in correlation with the ink ejection volume). More specifically, the treatment liquid controller 133 also serves as the treatment liquid head driver.

By supplying the drive signals output by the treatment liquid controller 133 to the treatment liquid head 11, treatment liquid is ejected from the corresponding nozzles. By supplying the drive signals output by the ink head driver 134 to the ink heads 50, ink is ejected from the corresponding nozzles 51. By controlling the ejection of treatment liquid from the treatment liquid head 11 and the ejection of ink from the ink heads 50 in synchronism with the conveyance speed of the recording medium 20, an image is formed on the recording medium 20.

As described above, the ejection volume and the ejection timing of the droplets from the treatment liquid head 11 and the ink heads 50 are controlled, on the basis of the treatment liquid ejection data and ink ejection data generated by implementing prescribed signal processing in the print controller 130. By this means, prescribed dot size and dot positions can be achieved.

An electrorheological fluid (for example, particle-dispersed liquid) applied with an electric field by an external source, such as the electrode unit 28, has a property whereby it does not flow unless the externally applied stress $\tau$ exceeds a certain uniform value $\tau y$ (the yield stress). Furthermore, the value of this yield stress $\tau y$ depends on the properties of the electrorheological fluid and the intensity of the electric field applied to the electrorheological fluid. By setting the yield stress $\tau y$ to an appropriate value, it is possible to suppress the flow of the treatment liquid 88 and the permeation of the treatment liquid 88 into the recording medium 20 after its deposition on the recording medium 20, and hence beneficial effects can be obtained in terms of improving printing quality.

For example, in respect of treatment liquid bleeding and spreading, the yield stress $\tau y$ is set so as to satisfy the relationship:

"Capillary force between treatment liquid and medium"<"Yield stress $\tau y$ of treatment liquid". (Condition 1)

Furthermore, in respect of interference between the droplets on the medium, and movement of the droplets, the yield stress $\tau y$ is set so as to satisfy the relationship:

"Aggregation force between treatment liquid droplets"<"Yield stress $\tau y$ of treatment liquid". (Condition 2)

Moreover, by setting the yield stress $\tau y$ in such a manner that it satisfies both the conditions (1) and (2), and then applying an electric field of intensity corresponding to this yield stress value, it is possible to prevent bleeding and spreading of the treatment liquid 88 at the same time as avoiding interference between the droplets on the recording medium 20, or movement of the droplets, on the surface of the recording medium 20.

According to the inkjet recording apparatus 10 having the above-described composition, when an electric field is applied to the treatment liquid 88 having been deposited on the recording medium 20 (electric field ON), an electrorheological effect is generated, and the viscosity of the treatment liquid 88 increases, thereby suppressing the permeation of the treatment liquid 88 into the recording medium 20 and thus maintaining the shape of the droplets. In this state, bleeding and spreading of the treatment liquid 88 is suppressed, and interference between mutually adjacent treatment liquid droplets on the recording medium 20, and movement of the treatment liquid and the like, is also restricted.

By ejecting inks containing coloring materials from the ink heads 50, in this state, then it is possible to deposit the ink liquids onto an area where sufficient treatment liquid is present. Accordingly, it is possible reliably to cause mixing of the liquids of different types. In a state where the treatment liquid and the ink are reliably mixed together, the ink can be cured and fixed by irradiating light from the ultraviolet light source 16 (see FIG. 1).

Since the permeability of the treatment liquid (the maintainability of the treatment liquid droplets on the recording medium) varies depending on the type of recording medium used, then, in the inkjet recording apparatus 10 according to the present embodiment, the on and off switching of the electric field, and the intensity of the application voltage (electric field intensity) when the electric field is applied, are controlled in accordance with the type of the recording medium 20.

Figure 10:
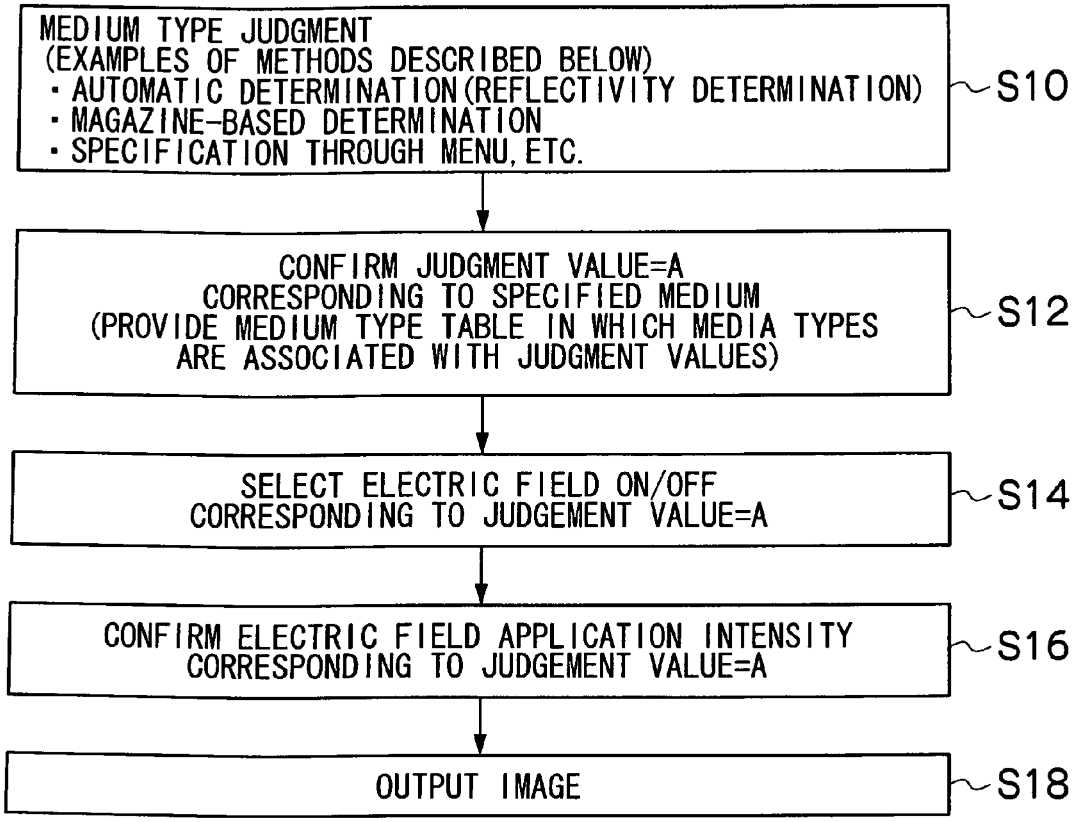
FIG. 10 is a flowchart showing a control procedure of the inkjet recording apparatus according to the first embodiment.

FIG. 10 is a flowchart indicating the control sequence of the inkjet recording apparatus 10 according to the present embodiment. Firstly, a medium type judgment process is implemented (step S10). This judgment may be based, for example, on automatic determination by measuring the optical reflectivity of the recording medium 20, or on determination of the paper magazine, or specification of a paper type through a user interface menu, or the like.

On the basis of the medium type judgment result in step S10, the judgment value corresponding to the type of recording medium 20 used is established to be A (step S12). The inkjet recording apparatus 10 is provided with an information storage device (internal memory or external memory) which stores data for a medium type table that associates media types with judgment values. The judgment value is determined by referring to the medium type table.

Thereupon, the on/off switching of the electric field is selected in accordance with the judgment value=A determined at step S12 (step S14). In this, if a medium of greater permeability than a prescribed reference value (a permeable medium) is used, then switching on of the electric field is selected. On the other hand, if a medium having permeability not greater than the prescribed reference value (a medium of low permeability or a non-permeable medium) is used, then switching off of the electric field is selected. The permeation characteristics (permeation time) of the treatment liquid are evaluated previously for each type of medium, and a judgment value corresponding to the permeability is set, by taking account of the electric field on/off selection made in step S12. Furthermore, table data which associates the value of the judgment value=A with the on or off switching of the electric field is stored in the inkjet recording apparatus 10, and the on/off switching of the electric field is selected on the basis of this table.

Next, the procedure advances to step S16, and an electric field application intensity corresponding to the judgment value=A is established. Table data which associates the value of the judgment value=A with the electric field intensity is stored in the inkjet recording apparatus 10, and a suitable intensity is determined on the basis of this table.

According to the processing results of steps S14 and S16, the electric field produced by the electrode unit 28 (see FIGS. 1, 7 and 8) is controlled, and an image is formed on the recording medium 20 by controlling the deposition of treatment liquid and the ejection of ink on the basis of the image data (S18 in FIG. 10).

According to the above-described embodiment of the present invention, due to the electrorheological effect in the treatment liquid, the permeation of the treatment liquid into the recording medium 20 is suppressed, and hence ink can be deposited in a state where there is a sufficient amount of treatment liquid remaining on the surface of the recording medium. Therefore, the two liquids can be made to mix together reliably. Accordingly, high-quality image formation can be achieved.

Furthermore, the present embodiment also has the following advantages. Supposing that a composition is adopted in which particles that introduce electrorheological properties (electrorheological property introducing particles) are contained in an ultraviolet-curable ink, then if the coloring material is a pigment, it is necessary to disperse the pigment within the main ink component, and there is the possibility that the inclusion of a large amount of electrorheological property introducing particles (dispersed micro-particles), with the aim of producing a strong electrorheological effect, may impede the dispersion of the pigment. Furthermore, if there is a large content of electrorheological property introducing particles, then a problem arises in that the viscosity of the ink increases and it becomes impossible to eject the ink. On the other hand, according to this embodiment of the present invention, by combining dispersed electrorheological effect introducing micro-particles in the first liquid (treatment liquid) which does not contain coloring material, then even if the coloring material of the ultraviolet-curable ink is a pigment, it is possible to achieve a system which does not impede the dispersion of the pigment. Furthermore, even if a highly viscous treatment liquid becomes necessary in order to achieve a high electrorheological effect, it is still possible to deposit the treatment liquid by means of an application device or the like (a non-ejection device), rather than ejecting the treatment liquid by means of an inkjet method.

In other words, when implementing the present invention, it is also possible to use an application device, or other type of device, rather than a device which ejects liquid from inkjet nozzles, as a device which deposits the first liquid serving as the treatment liquid (pre-treatment liquid) onto the recording medium.

There are no particular restrictions on the device used for this application step, and it is possible to select a commonly known application device, according to the required objective. Possible examples of the application devices include: an air doctor coater, a blade coater, a rod coater, a knife coater, a squeeze coater, an immersion coater, a reverse roll coater, a transfer roll coater, a gravure coater, a kiss roll coater, a cast coater, a spray coater, a curtain coater, an extrusion coater, or the like.

Furthermore, in implementing the present invention, it is possible to use ultraviolet light, visible light, or the like, as an exposure light source which applies energy for promoting the polymerization of the polymerizable compound. Moreover, it is also possible to apply energy by means of radiation other than light, such as $\alpha$ rays, $\gamma$ rays, X rays, an electron beam, or the like, but of the various options, the use of ultraviolet light or visible light is most desirable from the viewpoints of cost and safety, and use of ultraviolet light is especially desirable. The amount of energy required for the curing reaction varies depending on the type and amount of the polymerization initiator, and it is about 1 mJ/cm$^2$ to 500 mJ/cm$^2$ in general.

Second Embodiment

Figure 11:
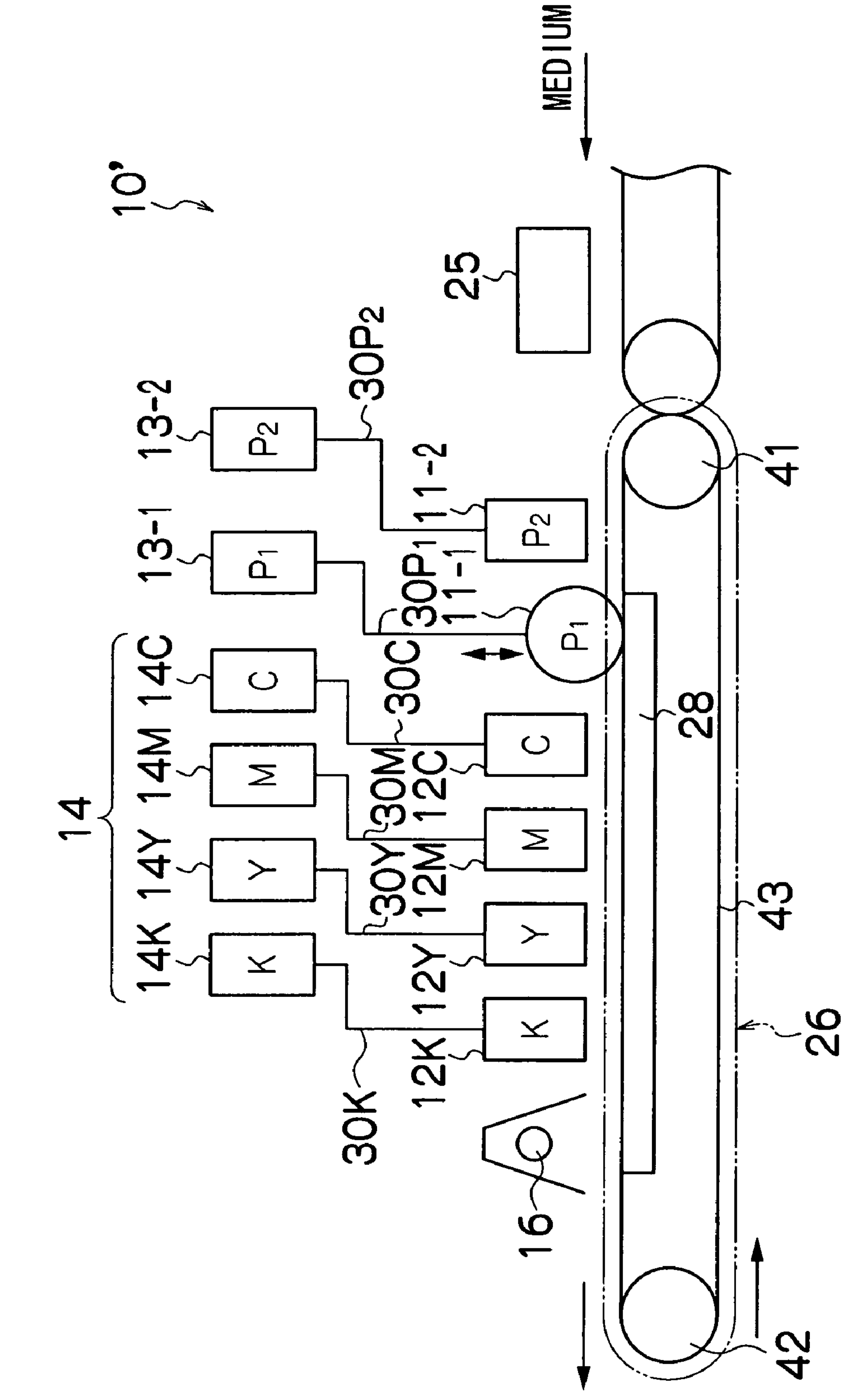
FIG. 11 is a principal compositional diagram of an inkjet recording apparatus according to a second embodiment of the present invention.

Next, a second embodiment of the present invention is described. FIG. 11 is a principal compositional diagram of an inkjet recording apparatus 10' according to a second embodiment of the present invention. In FIG. 11, the elements which are the same as or similar to the composition shown in FIG. 1 are denoted with the same reference numerals and description thereof is omitted here.

The inkjet recording apparatus 10' shown in FIG. 11 uses two types of treatment liquid, as the first liquids serving as pre-treatment liquids. More specifically, the first treatment liquid (P1) is an electrorheological fluid having a composition including a polymerization initiator, a coloring material dispersion inhibitor, an oil forming a high-boiling-point organic solvent, and particles that introduce electrorheological properties. The second treatment liquid (P2) is a liquid which has no electrorheological properties (a non-electrorheological fluid) and contains a polymerization initiator, a coloring material dispersion inhibitor, and an oil forming a high-boiling-point organic solvent.

The first treatment liquid P1 is used with respect to a recording medium having high permeability (permeable medium treatment liquid). On the other hand, the second treatment liquid P2 is used with respect to a recording medium which is non-permeable or has low permeability (non-permeable medium treatment liquid).

The inkjet recording apparatus 10' comprises an application roller 11-1 (corresponding to a "first treatment liquid deposition device"), as a first device for depositing the first treatment liquid P1 on the recording medium (not shown in FIG. 11), and an ejection head 11-2 (corresponding to a "second treatment liquid deposition device"), as a second device for deposing the second treatment liquid P2 on the recording medium.

The inkjet recording apparatus 10' further comprises a first treatment liquid storing and loading unit 13-1, which stores the first treatment liquid P1, and a second treatment liquid storing and loading unit 13-2, which stores the second treatment liquid P2. The application roller 11-1 receives a supply of the first treatment liquid P1 from the first treatment liquid storing and loading unit 13-1, through a tubing channel 30P1, and the treatment liquid head 11-2 receives a supply of the second treatment liquid P2 from the second treatment liquid storing and loading unit 13-2, through a tubing channel 30P2.

The application roller 11-1 is, for example, made of a porous member, and is composed in such a manner that the first treatment liquid P1 is applied to a prescribed region of the recording medium (all or a portion of the recording medium), by moving the recording medium in the paper feed direction while causing the application roller 11-1 soaked with the treatment liquid P1 to make contact with the recording medium.

The application roller 11-1 may have a length corresponding to the full width of the recording medium by means of one (a single) long roller member, and may also achieve the required length by aligning a plurality of roller modules divided in a direction (main scanning direction) substantially perpendicular to the conveyance direction of the recording medium. Furthermore, it is possible to adopt a composition in which a plurality of rows of application rollers are disposed in line with the conveyance direction of the recording medium.

Although not shown in FIG. 11, an elevator mechanism for raising and lowering the application roller 11-1 with respect to the recording medium is provided. By controlling the elevator mechanism in accordance with instructions from the system control system, thereby adjusting the height position of the application roller 11-1 (the relative position thereof in the direction perpendicular to the recording surface of the recording medium), it is possible to alter the contact pressure with respect to the recording medium, and the clearance with respect to the recording medium. In the case of a composition having a plurality of roller modules, a desirable mode is one in which a mechanism for controlling the vertical position is provided for each roller module.

The operation of depositing the treatment liquid P2 by the treatment liquid head 11-2 shown in FIG. 11 is the same as that of the treatment liquid head 11 described in FIG. 1, and description thereof is omitted here.

In the present embodiment, the first treatment liquid P1 or the second treatment liquid P2 is selected in accordance with the type of recording medium used, and the upward and downward movement of the application roller 11-1 is controlled, as well as the electric field applied by the electrode unit 28, in conjunction with this selection.

In other words, the first treatment liquid P1 is selected with respect to a recording medium of high permeability, and the application roller 11-1 is lowered to a position where it makes contact with the recording medium, thereby depositing the first treatment liquid P1 onto the recording medium, in addition to which, a prescribed voltage is applied to the electrode unit 28, thereby increasing the viscosity of the first treatment liquid P1 on the recording medium, due to an electrorheological effect. On the other hand, the second treatment liquid P2 is selected with respect to non-permeable medium or recording medium of low-permeability. In this case (when the first treatment liquid P1 is not deposited), the application roller 11-1 is raised to a prescribed withdrawn position which is distanced from the recording medium, and furthermore, the electric field of the electrode unit 28 is switched to off, the treatment liquid head 11-2 is driven and the second treatment liquid P2 is thereby deposited onto the recording medium.

From the viewpoint of arranging the electrode unit 28 satisfactorily in the required range, taking account of the region (range) in which an electric field is to be generated by the electrode unit 28, a desirable mode is one in which the relative positional relationship of the application roller 11-1 and the treatment liquid head 11-2 is such that, as shown in FIG. 11, the treatment liquid head 11-2 is disposed on the upstream side (right-hand side in FIG. 11) in terms of the conveyance direction of the recording medium, and the application roller 11-1 is disposed to the downstream side (at a later stage) from the treatment liquid head 11-2.

Instead of the application roller structure which comprises the porous member described above, it is also possible to adopt a treatment liquid application mechanism (device) using an application roller made of a rubber member, or the like, and having a structure in which the treatment liquid is caused to flow onto the recording medium along the circumferential surface of the application roller, while rotating the application roller in a prescribed direction.

The above-described device that applies the treatment liquid by using a member such as the application roller 11-1, or the like, has a merit in that it enables handling of a liquid of high viscosity of a level which is difficult to eject by means of an inkjet ejection head, as well as also enabling a large amount of liquid to be deposited in a short period of time.

On the other hand, if the composition that deposits the treatment liquid by means of the ejection head (the treatment liquid head 11 in FIG. 1 or the treatment liquid head 11-2 in FIG. 11) is adopted, then it is possible to apply the treatment liquid selectively to the required region of the recording medium (for example, only to the regions to be printed with ink), on the basis of the image data, and therefore a beneficial effect is obtained in that the amount of treatment liquid consumed can be reduced in comparison with the application device using a roller, or the like.

Figure 12:
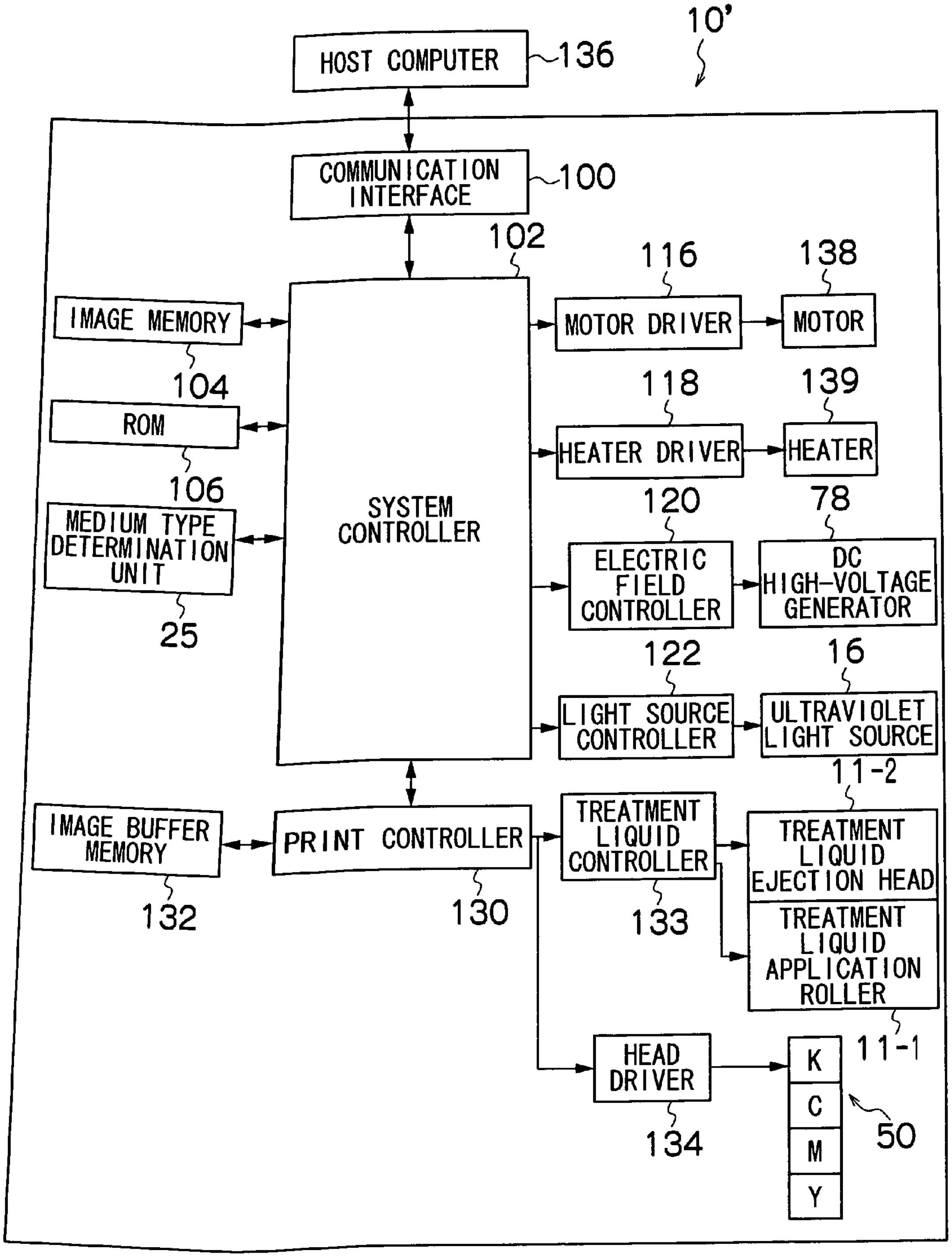
FIG. 12 is a principal block diagram showing the system configuration of the inkjet recording apparatus according to the second embodiment.

FIG. 12 is a principal block diagram showing the system configuration of the inkjet recording apparatus 10' according to the second embodiment shown in FIG. 11. In FIG. 12, the elements which are the same as or similar to the composition described in FIG. 9 are denoted with the same reference numerals and description thereof is omitted here.

The print controller 130 shown in FIG. 12, in conjunction with the treatment liquid controller 133, selects the treatment liquid in accordance with the type of the recording medium, as well as controlling the application roller 11-1 and the treatment liquid head 11-2 in accordance with this selection. More specifically, in the present embodiment, the combination of the print controller 130 and the treatment liquid controller 133 corresponds to the "treatment liquid selection control device".

Figure 13:
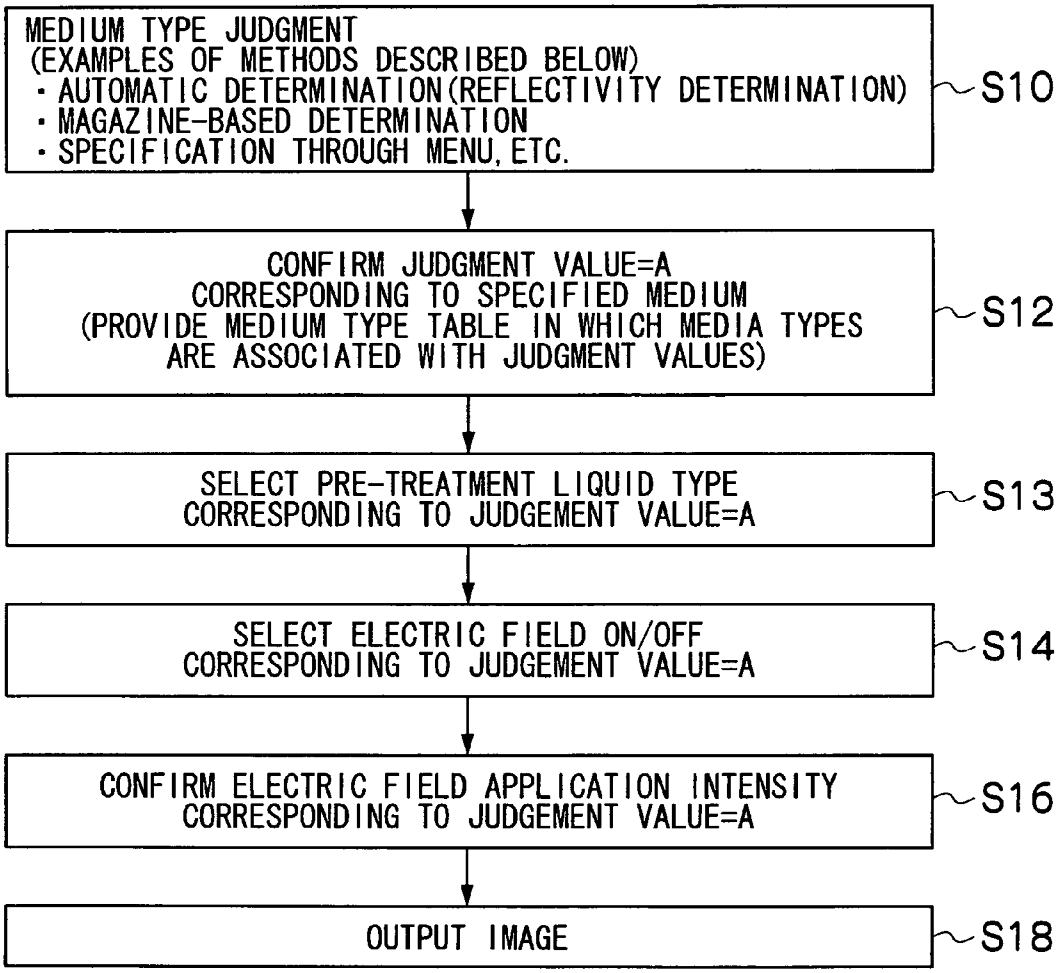
FIG. 13 is a flowchart showing a control procedure of the inkjet recording apparatus according to the second embodiment.

FIG. 13 is a flowchart indicating the control sequence of the inkjet recording apparatus 10' according to the second embodiment. In FIG. 13, the steps which are the same as or similar to those of the flowchart described in FIG. 10 are denoted with the same step numbers and description thereof is omitted here.

In the flowchart in FIG. 13, step S13 is introduced between steps S12 and S14 in FIG. 10. As shown in FIG. 13, after step S12 the procedure advances to step S13. At step S13, the type of pre-treatment liquid corresponding to the judgment value=A determined at step S12 is selected. In this, if a medium of greater permeability than a prescribed reference value (a permeable medium) is used, then the first treatment liquid is selected. On the other hand, if a medium having permeability not greater than the prescribed reference value (a medium of low permeability or a non-permeable medium) is used, then the second treatment liquid is selected. The permeation characteristics (permeation time) of the treatment liquid are evaluated previously for each type of medium, and a judgment value corresponding to the permeability is set, by taking account of the judgment on the selection of liquid type made in step S13. Furthermore, data for a table which specifies associations between the judgment value=A and the type of treatment liquid used is stored in the inkjet recording apparatus 10, and the treatment liquid is determined on the basis of this table.

After step S13, the procedure advances to step S14, and switching on or off of the electric field is selected. The following steps are the same as those in FIG. 10, and description thereof is omitted here.

According to the second embodiment described above, it is possible to deposit the suitable treatment liquid in accordance with the type of recording medium.

Third Embodiment

Figure 14:
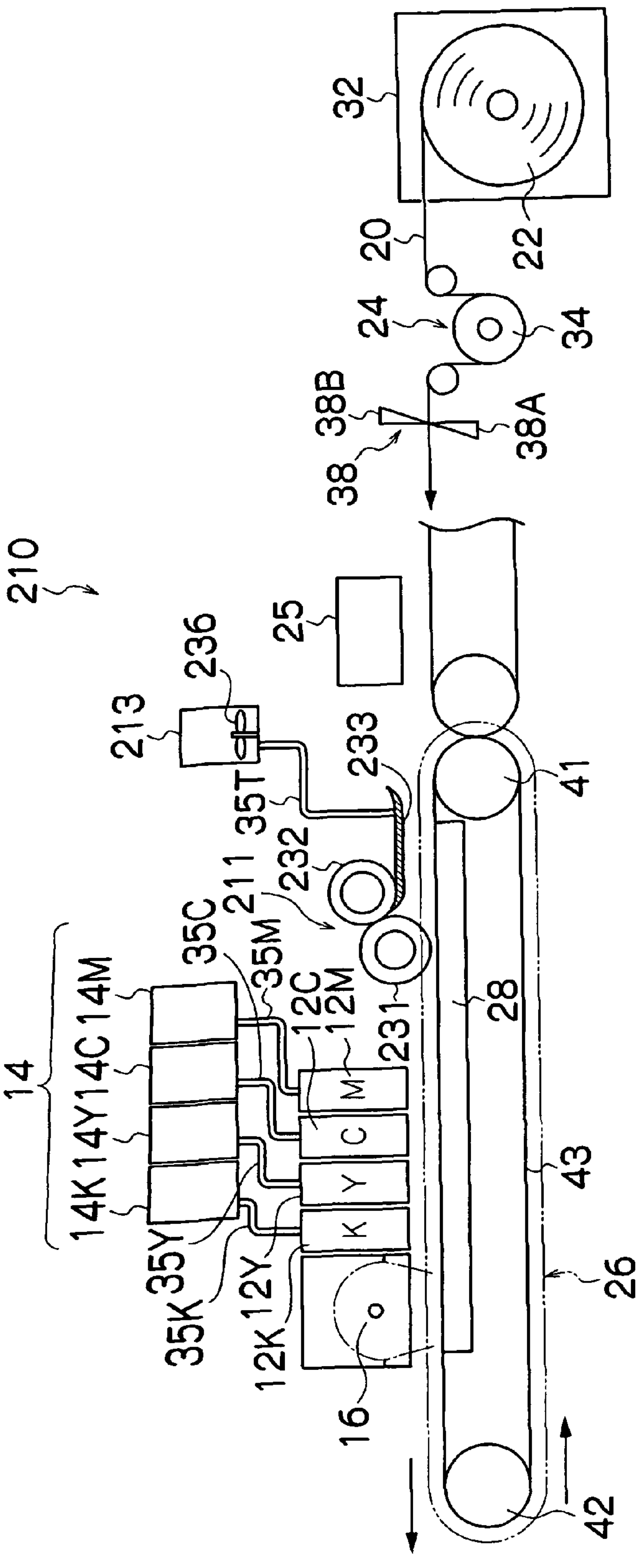
FIG. 14 is a general compositional diagram of an inkjet recording apparatus according to a third embodiment of the present invention.

FIG. 14 is a general schematic drawing of an inkjet recording apparatus 210 which forms a third embodiment of an image forming apparatus according to the present invention. In FIG. 14, the elements which are the same as or similar to the composition shown in FIG. 1 are denoted with the same reference numerals and description thereof is omitted here.

As shown in FIG. 14, the inkjet recording apparatus 210 comprises: a treatment liquid application mechanism 211 (corresponding to the "treatment liquid deposition device") for applying the first liquid serving as the treatment liquid (pre-treatment liquid); the plurality of ink ejection heads (corresponding to the "ink ejection devices"; hereinafter referred to as "ink heads") 12M, 12C, 12Y and 12K, provided respectively to correspond to the inks (second liquids) of colors of magenta (M), cyan (C), yellow (Y), black (K); a treatment liquid tank 213 which stores the treatment liquid to be supplied to the treatment liquid application mechanism 211; the ink storing and loading unit 14 which stores the inks to be supplied to the ink heads 12M, 12C, 12Y and 12K; the ultraviolet light source (corresponding to the "radiation irradiation device"; hereinafter referred to as "ultraviolet light source") 16 forming the fixing promotion device; the medium supply unit 22; the decurling unit 24; the medium type determination unit 25 (corresponding to the "recording medium type identification device") which determines the type of recording medium 20; the conveyance unit 26 for conveying the recording medium 20; and the electrode unit 28 (corresponding to the "electric field deposition device").

The treatment liquid application mechanism 211 comprises: an application roller 231, which makes contact with the recording medium 20; a treatment liquid supply roller 232, which makes external contact with the application roller 231 and supplies the treatment liquid to the application roller 231; and a container (immersion container) 233, which holds the treatment liquid into which the treatment liquid supply roller 232 is immersed.

The treatment liquid tank 213 supplies the treatment liquid to the immersion container 233, through a prescribed channel 35T. The treatment liquid unit 213 has a warning device (for example, a display device or an alarm sound generator) for warning when the remaining amount of the treatment liquid is low, and it has a mechanism for preventing loading errors between types of liquid. Furthermore, in order to prevent aggregation and settling of the dispersed micro-particles contained in the treatment liquid, a stirring blade 236 is provided as a stirring device inside the treatment liquid tank 213. The details of composition of the treatment liquid are described hereinafter.

The ink storing and loading unit 14 has the ink tanks 14M, 14C, 14Y and 14K for storing the inks of the colors corresponding to the respective ink heads 12M, 12C, 12Y and 12K, and the tanks are connected to the heads 12M, 12C, 12Y and 12K, through prescribed channels 35M, 35C, 35Y and 35K. The ink storing and loading unit 14 has a warning device (for example, a display device or an alarm sound generator) for warning when the remaining amount of any ink is low, and has a mechanism for preventing loading errors among the colors.

Here, for the first liquid or the treatment liquid, a transparent treatment liquid (which contains no coloring material) containing "a polymerization initiator, a coloring material dispersion inhibitor, an oil acting as a high-boiling-point organic solvent, and particles that introduce electrorheological properties (hereinafter referred to as "electrorheological property introducing particles")" is used.

Here, the high-boiling-point organic solvent (oil) is used as the solvent; however, instead of this, it is also possible to use a radiation-curable monomer or oligomer as the solvent.

Moreover, the treatment liquid used in the third embodiment (and a fourth embodiment described hereinafter) has characteristics in which the materials selected for the solvent and the electrorheological property introducing particles are both colorless and transparent, and have mutually proximate refractive indices. In order to guarantee the transparency of the treatment liquid, it is preferable through experimental observation that the difference between the refractive indices of the solvent and the electrorheological property introducing particles is within 0.1, and more desirably within 0.05.

An example of such a combination is one where diethyl phthalate (refractive index=1.505) forming a treatment liquid oil, or hexanediol diacrylate (HDDA) (refractive index=1.456) forming a monomer liquid, is used as the solvent, and silica (refractive index=1.46) or mica (refractive index=1.56) is used for the electrorheological property introducing particles.

Furthermore, for the second liquids or the inks, inks having a liquid composition containing "an ultraviolet-curable polymerizable compound (monomer, oligomer, or the like), and a pigment forming a coloring material" are used, in equal number to the number of colors used (in the present embodiment, four colors of M, C, Y and K). The details of the ink set used in the present embodiment are described below.

When the ink and the treatment liquid mix together, the dispersion of the coloring material between deposited droplets is suppressed by the coloring material dispersion inhibitor in the treatment liquid, and the polymerization reaction of the liquids progresses due to the mixing of the two liquids and the irradiation of the radiation onto the mixed liquids, thereby curing and fixing the ink.

The application roller 231 shown in FIG. 14 is constituted by a member made of rubber, or the like, and has a structure in which the treatment liquid is caused to flow onto the recording medium 20 along the circumferential surface of the application roller 231, while rotating the application roller 231 in a prescribed direction.

This application roller 231 may have a length corresponding to the full width of the recording medium 20 by means of one (a single) long roller member, and may also achieve the required length by aligning a plurality of roller modules divided in a direction (main scanning direction) substantially perpendicular to the conveyance direction of the recording medium 20. Furthermore, it is possible to adopt a composition in which a plurality of rows of application rollers are disposed in line with the conveyance direction of the recording medium 20.

Although not shown in FIG. 14, an elevator mechanism for raising and lowering the application roller 231 with respect to the recording medium 20 is provided. By controlling the elevator mechanism in accordance with instructions from the system control system, thereby adjusting the height position of the application roller 231 (the relative position thereof in the direction perpendicular to the recording surface of the recording medium 20), it is possible to alter the content pressure with respect to the recording medium 20, and the clearance with respect to the recording medium 20. In the case of a composition having a plurality of roller modules, a desirable mode is one in which a mechanism for controlling the vertical position is provided for each roller module.

The electrode unit 28 attached to the conveyance unit 26 is disposed at least in a region which extends from the treatment liquid deposition start position of the application roller 231 to the ultraviolet light irradiation position of the ultraviolet light source 16, and it is able to generate an electric field in this region.

Figure 15:
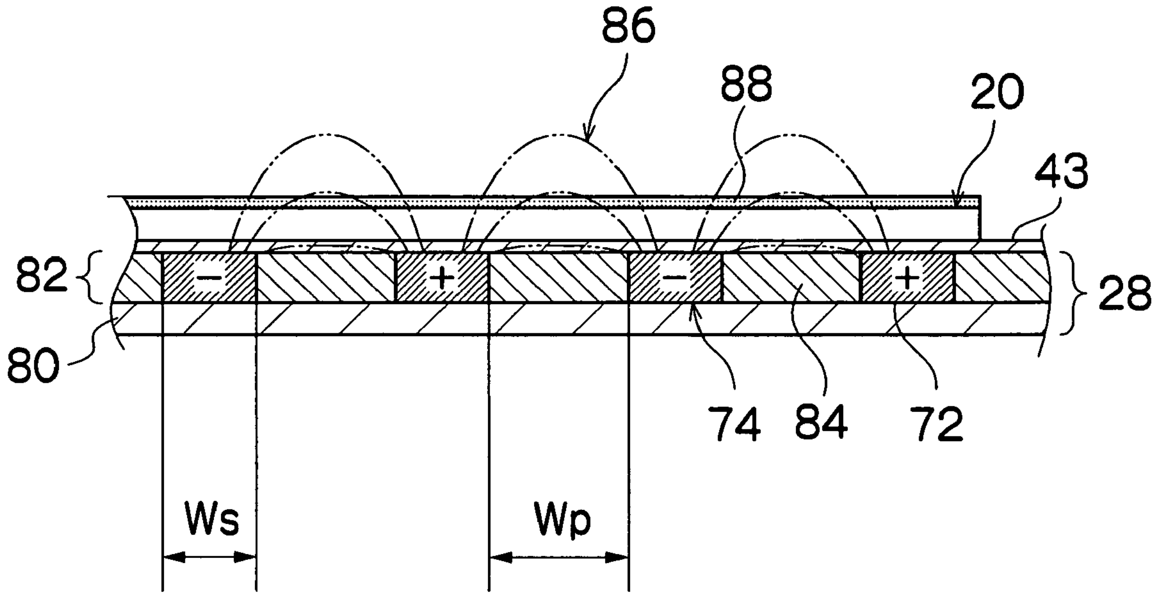
FIG. 15 is a cross-sectional view along line 8-8 in FIG. 7, corresponding to the third embodiment.

As described with reference to FIG. 7, when a prescribed voltage from the DC high-voltage generator 78 is applied between the electrodes 72 and 74, an electric field is generated between the adjacent electrodes 72 and 74, as shown in FIG. 15. In FIG. 15, the lines of electric force 86 of the electric field generated in this case are shown by double-dotted broken lines. As shown in FIG. 15, the lines of electric force 86 of the electric field created between mutually adjacent electrodes 72 and 74 form approximately arc-shaped lines, and an electric field is also created above the print surface of the recording medium 20. Consequently, an electric field is applied to the treatment liquid 88 having been deposited on the recording medium 20. In this case, a minimal current flows through the treatment liquid 88 on the recording medium 20, through the minimally conductive belt 43 and the recording medium 20. An electrorheological effect is thus produced in the treatment liquid 88 deposited on the recording medium 20, thereby increasing the viscosity of the deposited treatment liquid 88. This state of increased viscosity due to the aforementioned electrorheological effect is sustained while the electric field continues to be applied. Accordingly, the deposited treatment liquid 88 is maintained in a liquid state, and its permeation into the recording medium 20, bleeding, or the like, are suppressed.

Figure 16:
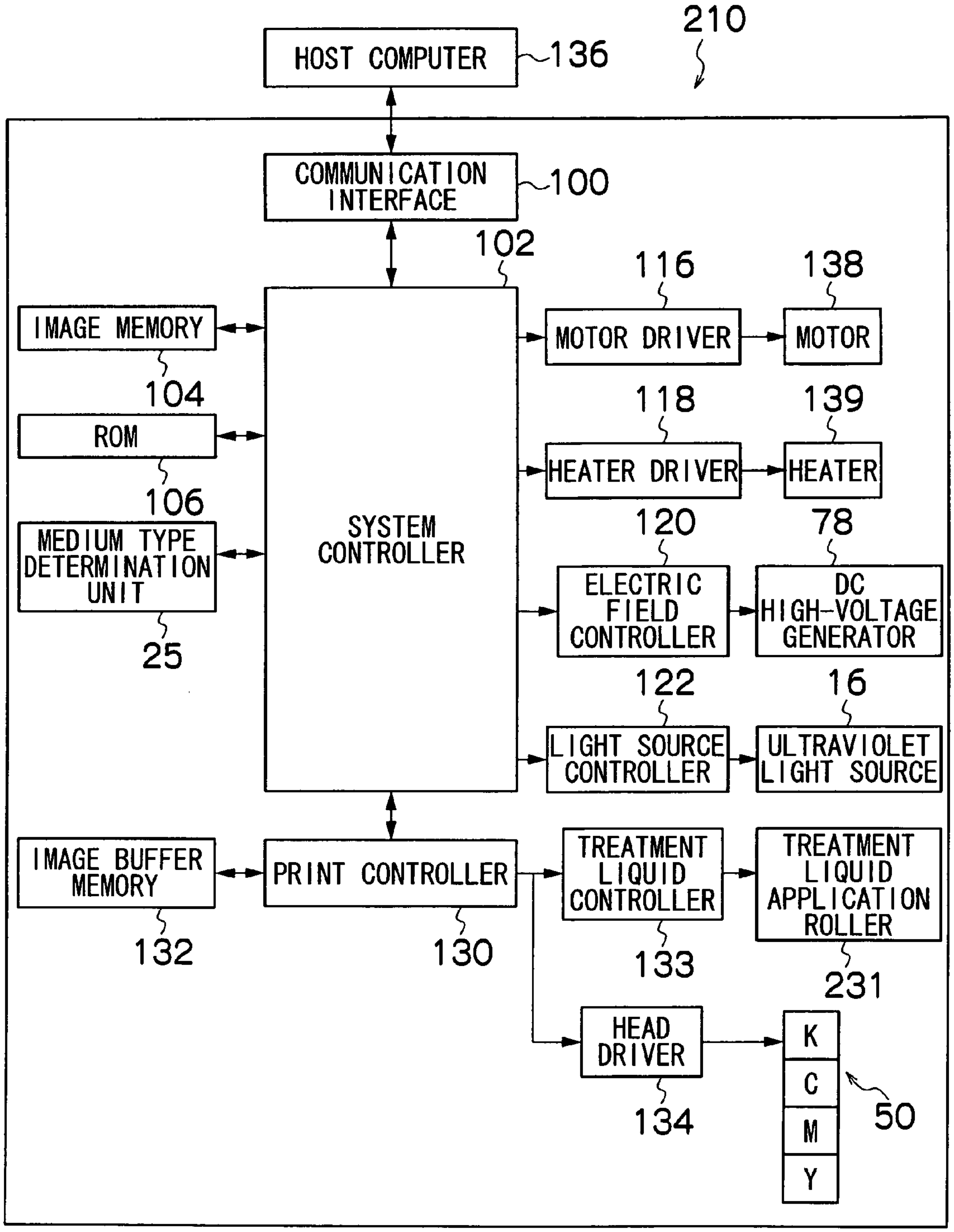
FIG. 16 is a principal block diagram showing the system configuration of the inkjet recording apparatus according to the third embodiment.

FIG. 16 is a principal block diagram showing the system configuration of the inkjet recording apparatus 210 according to the third embodiment. In FIG. 16, the elements which are the same as or similar to the compositions described in FIGS. 9 and 12 are denoted with the same reference numerals and description thereof is omitted here.

As shown in FIG. 16, the inkjet recording apparatus 210 comprises the treatment liquid controller 133 for controlling the application roller 231.

The print controller 130 functions as the treatment liquid application control device which generates treatment liquid application data in conjunction with the treatment liquid controller 133, and controls the application operation performed by the application roller 231.

Prescribed signal processing is applied to the input image data in the print controller 130, and application of the treatment liquid is controlled by means of the treatment liquid controller 133, and the ink ejection volume and ejection timing of the ink heads 50 of the respective colors are controlled by means of the head driver 134, on the basis of the image data. By this means, prescribed dot size and dot positions can be achieved.

Specifically, the treatment liquid controller 133 outputs drive signals for driving the application roller 231, on the basis of the treatment liquid application data generated from the image data (treatment liquid volume data generated in correlation with the ink ejection volume).

The treatment liquid is deposited onto the recording medium 20 by means of the application roller 231 rotating while making contact with the recording medium 20. Furthermore, by supplying the drive signals output by the ink head driver 134 to the ink heads 50, ink is ejected from the corresponding nozzles 51. By controlling the deposition of treatment liquid from the application roller 231 and the ejection of ink from the ink heads 50 in synchronism with the conveyance speed of the recording medium 20, an image is formed on the recording medium 20.

As described above, the treatment liquid application volume and application timing from the application roller 231, and the ejection volume and the ejection timing of the droplets from the ink heads 50 are controlled, on the basis of the treatment liquid application data and ink ejection data generated by implementing prescribed signal processing in the print controller 130. By this means, prescribed dot size and dot positions can be achieved.

Figure 17:
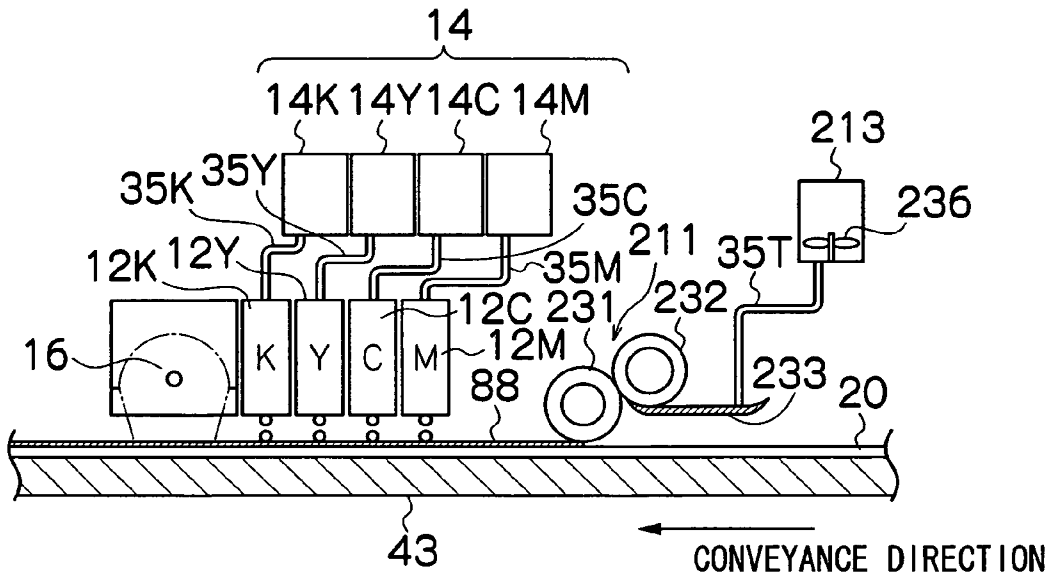
FIG. 17 is a principal compositional diagram of the inkjet recording apparatus according to the third embodiment.

According to the inkjet recording apparatus 10 having the above-described composition, as shown in FIG. 17, the treatment liquid 88 is applied to the recording medium 20 by the application roller 231, and an electric field is applied through the conductive belt 43 to the treatment liquid 88 having been applied on the recording medium 20. Due to the action of this electric field, an electrorheological effect is produced in the treatment liquid 88, thereby increasing the viscosity of the treatment liquid 88, and hence the permeation of the treatment liquid 88 into the recording medium 20 is suppressed and the treatment liquid 88 is maintained in a liquid state on the recording medium 20. In this state, bleeding and spreading of the treatment liquid 88 is suppressed, and movement of the treatment liquid 88 on the recording medium 20 is also prevented.

By ejecting inks containing coloring materials from the ink heads 50 onto the treatment liquid 88 having been deposited on the recording medium 20, it is possible to deposit the ink liquids onto an area where sufficient treatment liquid is present. Accordingly, it is possible reliably to cause mixing of the liquids of different types. Furthermore, due to the presence of the treatment liquid 88, it is possible to avoid the phenomenon of "landing interference" which causes image degradation due to the ink droplets moving and becoming fixed in positions displaced from the original landing positions, and/or deformation and disruption of the shape of the ink droplets, as a result of the ink droplets combining together immediately after landing on the recording medium and before fixing on the recording medium, and it is also possible to inhibit the dispersion of the coloring material in the treatment liquid 88 by increasing the viscosity of the treatment liquid 88.

In a state where the treatment liquid and the ink are reliably mixed together in this way, the ink can be cured and fixed by irradiating light from the ultraviolet light source 16 (see FIG. 14). Since the permeability of the treatment liquid (the maintainability of the treatment liquid droplets on the recording medium) varies depending on the type of recording medium used, then, in the inkjet recording apparatus 10 according to the present embodiment, the on and off switching of the electric field, and the intensity of the application voltage (electric field intensity) when the electric field is applied, are controlled in accordance with the type of the recording medium 20.

According to the above-described embodiment of the present invention, due to the electrorheological effect in the treatment liquid, the permeation of the treatment liquid into the recording medium 20 is suppressed, and hence ink can be deposited in a state where there is a sufficient amount of treatment liquid remaining on the surface of the recording medium. Therefore, the two liquids can be made to mix together reliably. Accordingly, high-quality image formation can be achieved.

Moreover, according to the present embodiment, materials are selected for both the solvent and the electrorheological property introducing particles in the treatment liquid that are colorless and transparent and have mutually proximate refractive indices. Therefore, it is possible to prevent the treatment liquid from becoming clouded, and hence the colorless and transparent treatment liquid can be achieved. Consequently, the colors of the ink can be reproduced faithfully.

Furthermore, the present embodiment also has the following advantages. Supposing that a composition is adopted in which particles that introduce electrorheological properties (electrorheological property introducing particles) are contained in an ultraviolet-curable ink, then if the coloring material is a pigment, it is necessary to disperse the pigment within the main ink component, and there is the possibility that the inclusion of a large amount of electrorheological property introducing particles (dispersed micro-particles), with the aim of producing a strong electrorheological effect, may impede the dispersion of the pigment. Furthermore, if there is a large content of electrorheological property introducing particles, then a problem arises in that the viscosity of the ink increases and it becomes impossible to eject the ink. On the other hand, according to this embodiment of the present invention, by combining dispersed electrorheological effect introducing micro-particles in the first liquid (treatment liquid) which does not contain coloring material, then even if the coloring material of the ultraviolet-curable ink is a pigment, it is possible to achieve a system which does not impede the dispersion of the pigment. Furthermore, even if a highly viscous treatment liquid becomes necessary in order to achieve a high electrorheological effect, it is still possible to deposit the treatment liquid by means of an application device or the like (a device other than one based on ejection by an inkjet method).

If the average particle size of the electrorheological property introducing particles, which are dispersed in the treatment liquid, is relatively large, for example, 0.3 μm to 10 μm, then an application device is suitable for the treatment liquid deposition device, and if the average particle size of the electrorheological property introducing particles dispersed in the treatment liquid is relatively small, for example, 100 nm to 1 μm, then a liquid ejection device based on an inkjet method is suitable.

If the average particle size of the electrorheological property introducing particles dispersed in the treatment liquid lies in the overlap between these ranges (the average particle size of 0.3 μm to 1 μm), then it is possible to use either an application device or a liquid ejection device.

Instead of the structure shown in FIG. 14 using the application roller 231 made of the rubber member, or the like, it is also possible to adopt a treatment liquid application mechanism (device) which uses an application roller made of a porous member, whereby the treatment liquid is applied to a prescribed region of the recording medium (either the whole surface or a portion thereof), by moving the recording medium in the paper conveyance direction, while causing the application roller soaked with the treatment liquid to make contact with the recording medium 20.

There are no particular restrictions on the device used for this application step, and it is possible to select a commonly known application device, according to the required objective. Possible examples of the application devices include: an air doctor coater, a blade coater, a rod coater, a knife coater, a squeeze coater, an immersion coater, a reverse roll coater, a transfer roll coater, a gravure coater, a kiss roll coater, a cast coater, a spray coater, a curtain coater, an extrusion coater, or the like.

Furthermore, in implementing the present invention, it is possible to use ultraviolet light, visible light, or the like, as an exposure light source which applies energy for promoting the polymerization of the polymerizable compound. Moreover, it is also possible to apply energy by means of radiation other than light, such as α rays, γ rays, X rays, an electron beam, or the like, but of the various options, the use of ultraviolet light or visible light is most desirable from the viewpoints of cost and safety, and use of ultraviolet light is especially desirable. The amount of energy required for the curing reaction varies depending on the type and amount of the polymerization initiator, and it is about 1 mJ/cm$^2$ to 500 mJ/cm$^2$ in general.

Fourth Embodiment

Figure 18:
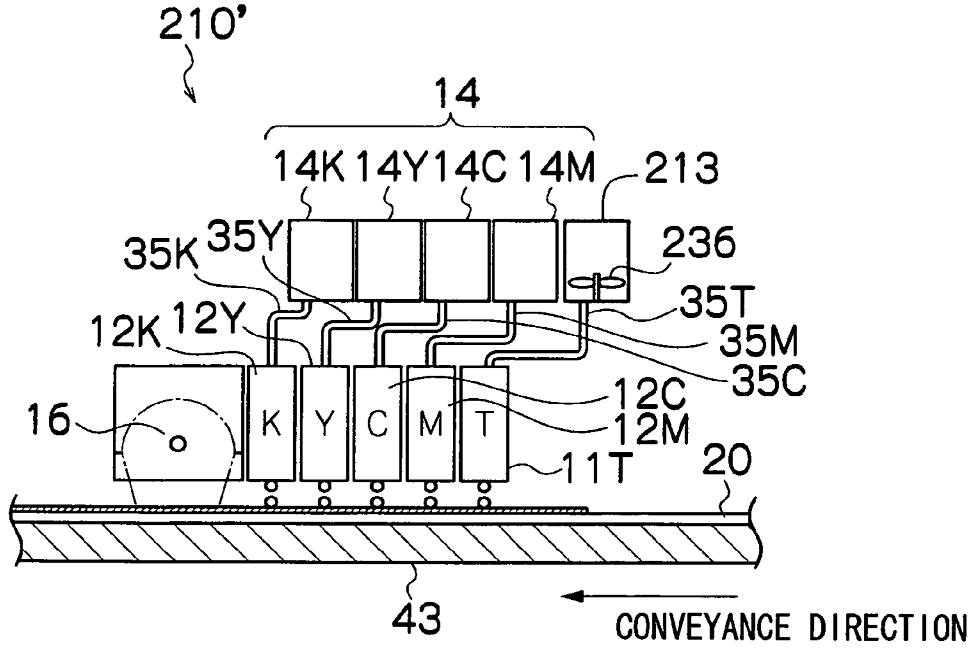
FIG. 18 is a principal compositional diagram of an inkjet recording apparatus according to a fourth embodiment of the present invention.

Next, a fourth embodiment of the present invention is described. FIG. 18 is a principal compositional diagram of an inkjet recording apparatus 210' according to a fourth embodiment of the present invention. In FIG. 18, the elements which are the same as or similar to the composition shown in FIGS. 1, 14 and 17 are denoted with the same reference numerals and description thereof is omitted here.

The inkjet recording apparatus 210' shown in FIG. 18 comprises a treatment liquid ejection head (hereinafter referred to as "treatment liquid head") 11T of inkjet-type as a device for depositing the first liquid serving as the treatment liquid, rather than the treatment liquid application mechanism 211 shown in FIGS. 14 and 17.

When the treatment liquid is ejected toward the recording medium 20 by the treatment liquid head 11T, an electrorheological effect is generated in the treatment liquid having been deposited on the recording medium 20 by applying an electric field to the deposited treatment liquid, thereby increasing the viscosity of the deposited treatment liquid. This state of increased viscosity due to the aforementioned electrorheological effect is sustained while the electric field continues to be applied. Accordingly, the deposited treatment liquid droplet is maintained in a liquid state in a substantially hemispherical shape on the recording medium 20, and its permeation into the recording medium 20, landing interference, bleeding, movement or the like, are suppressed.

In this high-viscosity state of the treatment liquid, ink droplets are deposited from the ink heads 12M, 12C, 12Y and 12K, onto the treatment liquid.

Similarly to the ink heads, the treatment liquid head 11T is a full line head having a length corresponding to the maximum width of the recording medium 20 used with the inkjet recording apparatus 210', and has a plurality of nozzles (ejection ports) arranged on a nozzle face through a length exceeding at least one edge of the maximum-size recording medium 20 (namely, the full width of the printable range).

Although not shown in the drawings, the structure of the treatment liquid head 11T is generally the same as that of the ink head 50 shown in FIGS. 2A to 5. Since it is sufficient that the treatment liquid is deposited on the recording medium 20 in a substantially uniform (even) fashion in the region where ink droplets are to be deposited, then it is not necessary to form treatment liquid droplets to a high density, in comparison with the ink. Consequently, the treatment liquid head 11T may also be composed with a reduced number of nozzles (a reduced nozzle density) in comparison with the ink head 50 for ejecting ink. Furthermore, a composition may also be adopted in which the nozzle diameter of the treatment liquid head 11T is greater than the nozzle diameter of the ink head 50 for ejecting ink.

The treatment liquid tank 213 is connected to the treatment liquid head 11T through a tubing channel 35T, and the treatment liquid is supplied to the treatment liquid head 11T through the tubing channel 35T. The supply system for the treatment liquid and the cleaning device (restoration device) for the treatment liquid head 11T have substantially the same composition as the ink supply system and cleaning device shown in FIG. 6, and they are not illustrated.

The system configuration of the inkjet recording apparatus 210' of the fourth embodiment shown in FIG. 18 is the same as the configuration described with reference to FIG. 9, and the description thereof is omitted here.

If the composition that deposits the treatment liquid by means of the inkjet-type liquid ejection head (treatment liquid head 11T) as shown in FIG. 9 or 18 is adopted, then it is possible to apply the treatment liquid selectively to the required region of the recording medium (for example, only to the regions to be printed with ink), on the basis of the image data, and therefore a beneficial effect is obtained in that wasteful consumption of treatment liquid can be reduced in comparison with the application device using a roller, or the like.

Modification 1

The above-described embodiments are related to the mixing of two liquids, namely, the pre-treatment liquid and the ink, but the present invention may also be applied to a case where a plurality of types of liquids, such as three or more types of liquids, are mixed together.

Furthermore, a mode is also possible in which a plurality of different types of pre-treatment liquids, such as two or more types, are prepared in advance, and one type of the treatment liquids or a suitable combination of two or more types of the treatment liquids are selected to be used, according to the type of recording medium used.

Modification 2

It is also possible to adopt a composition using an endless belt embedded with electrode pairs for generating electric field, instead of the conveyance unit 26 illustrated in FIGS. 1, 7 and 8. In this case, for example, the cross-sectional structure of the belt can be made similar to that shown in FIG. 8. Moreover, for the conveyance unit 26, it is also possible to use a structure that conveys a table that supports the medium (a table conveyance mechanism), instead of the belt conveyance mechanism.

Modification 3

The inkjet recording apparatus 10 described with reference to FIG. 1 has a composition in which the treatment liquid head 11 is arranged only on the upstream side of the ink head 12C in terms of the conveyance direction of the recording medium (the right-hand side in FIG. 1), and the inkjet recording apparatus 210' described with reference to FIG. 18 has a composition in which the treatment liquid head 11T is arranged only on the upstream side of the ink head 12M in terms of the conveyance direction of the recording medium (the right-hand side in FIG. 18). However, in implementing the present invention, it is also possible to adopt a composition in which a plurality of treatment liquid heads are respectively disposed on the upstream sides of the ink heads 12M, 12C, 12Y and 12K. According to this composition, it is possible to deposit a suitable amount of treatment liquid for each color of ink.

Modification 4

The ultraviolet-curable ink is used in the above-described embodiments, but in implementing the present invention, the ink is not limited to a light-curable ink, of which ultraviolet-curable ink is a typical example, and other radiation-curable inks which are cured by electron beams, X rays, or the like, may also be used. In this case, a fixing promotion processing unit (radiation irradiation device) using a radiation source suitable for activating the hardening agent (namely, activating polymerization) is provided, according to the type of ink used.

Furthermore, the inkjet recording apparatus using the page-wide full line type head having a nozzle row of a length corresponding to the entire width of the recording medium is described in the embodiments, but the scope of application of the present invention is not limited to this, and the present invention may also be applied to an inkjet recording apparatus using a shuttle head which performs image recording while moving a short recording head reciprocally.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An image forming apparatus, comprising:

a first treatment liquid deposition device which deposits a first treatment liquid onto a recording medium, the first treatment liquid containing a polymerization initiator and particles introducing electrorheological properties;

an electric field application device which applies an electric field to the first treatment liquid having been deposited on the recording medium;

a second treatment liquid deposition device which deposits a second treatment liquid onto the recording medium, the second treatment liquid containing a polymerization initiator and having no electrorheological properties;

a recording medium type identification device which identifies a type of the recording medium;

a treatment liquid selection control device which controls operation of the first treatment liquid deposition device and the second treatment liquid deposition device, in such a manner that one of the first treatment liquid and the second treatment liquid is selectively deposited onto the recording medium, in accordance with the type of the recording medium identified by the recording medium type identification device;

an ink ejection device which ejects ink toward the recording medium on which the one of the first treatment liquid and the second treatment liquid has been deposited, the ink containing a coloring material and a radiation-curable polymerizable compound; and a radiation irradiation device which irradiates radiation to cure the ink having been deposited on the recording medium.

2. The image forming apparatus as defined in claim 1, further comprising an electric field control device which controls the electric field created by the electric field application device in accordance with the type of the recording medium identified by the recording medium type identification device.

3. The image forming apparatus as defined in claim 1, wherein each of the first treatment liquid and the second treatment liquid further contains a coloring material dispersion inhibitor which prevents dispersion of the coloring material.

4. An image forming method of forming an image on a recording medium, the method comprising:

a treatment liquid preparation step of preparing a first treatment liquid and a second treatment liquid, the first treatment liquid containing a polymerization initiator and particles introducing electrorheological properties, the second treatment liquid containing a polymerization initiator and having no electrorheological properties;

a recording medium type identification step of identifying a type of the recording medium;

a treatment liquid selection step of selecting one of the first treatment liquid and the second treatment liquid in accordance with the type of recording medium identified in the recording medium type identification step;

a treatment liquid deposition step of depositing the one of the first treatment liquid and the second treatment liquid selected in the treatment liquid selection step, onto the recording medium;

an electric field application step of, if the first treatment liquid is selected in the treatment liquid selection step, applying an electric field to the first treatment liquid having been deposited on the recording medium;

an ink ejection step of ejecting ink toward the recording medium on which the one of the first treatment liquid and the second treatment liquid has been deposited, the ink containing a coloring material and a radiation-curable polymerizable compound; and a radiation irradiation step of irradiating radiation to cure the ink having been deposited on the recording medium.

5. The image forming method as defined in claim 4, wherein the electric field created in the electric field application step is controlled in accordance with the type of the recording medium identified in the recording medium type identification step.

* * * * *